United States Patent [19]

Johnson et al.

[11] 4,355,372

[45] Oct. 19, 1982

[54] MARKET SURVEY DATA COLLECTION METHOD

[75] Inventors: Tod Johnson, Scarsdale; Andrew Tarshis, New York; George Goldberg, Great Neck, all of N.Y.

[73] Assignee: NPD Research Inc., Floral Park, N.Y.

[21] Appl. No.: 220,140

[22] Filed: Dec. 24, 1980

[51] Int. Cl.³ .............................................. G06F 3/04
[52] U.S. Cl. .................................................... 364/900
[58] Field of Search ... 364/200 MS File, 900 MS File; 179/2 A; 358/85; 455/2; 235/376; 340/825.54, 825.55, 146.3 ED, 146.3 SY

[56] References Cited

U.S. PATENT DOCUMENTS

| | | | |
|---|---|---|---|
| 3,400,378 | 9/1968 | Smith et al. | 179/2 A |
| 3,819,862 | 6/1974 | Hedges | 179/2 A |
| 4,091,448 | 5/1978 | Clausing | 364/200 |
| 4,126,762 | 11/1978 | Martin et al. | 179/2 A |
| 4,153,931 | 5/1979 | Green et al. | 364/200 |
| 4,218,737 | 8/1980 | Buscher et al. | 364/900 |

*Primary Examiner*—Harvey E. Springborn
*Attorney, Agent, or Firm*—Hubbell, Cohen, Stiefel & Gross

[57] ABSTRACT

A method for independently electronically collecting related market survey data from a plurality of diverse locations (6,6') for temporary storage at each of the independent diverse locations (6,6') where the data is collected for subsequent transmission thereof from these locations (6,6') over a telephone type link (30,36,42) for accumulative processing thereof at a remote central electronic data processor. An interactive interchangeable prompt message display is displayed on a visual display device (32) indicating one of a plurality of market survey categories in a predefined sequence. An actual data input signal may be provided via a keyboard (70) or barboard (29) and/or wand (18,28) in response to the prompt message display with this input being stored in a memory (16) for subsequent transmission. Prior to storage in the memory (16), the data is stored in a buffer and is displayed on the display device (32) to enable confirmation prior to transfer to the bulk memory (16). When a confirmation command signal is provided to the microcomputer (10,12,14) the data is transferred to the bulk memory (16) and the display (32) is changed to display the next prompt message in the sequence. The sequence recycles for each market transaction for enabling independent integral storage (16) of each product transaction at the location of the unit (6,6'). This stored data is then transmitted to the remote data processor via acoustic coupling (30,36,42) to the telephone line.

9 Claims, 49 Drawing Figures

HARDWARE BLOCK DIAGRAM

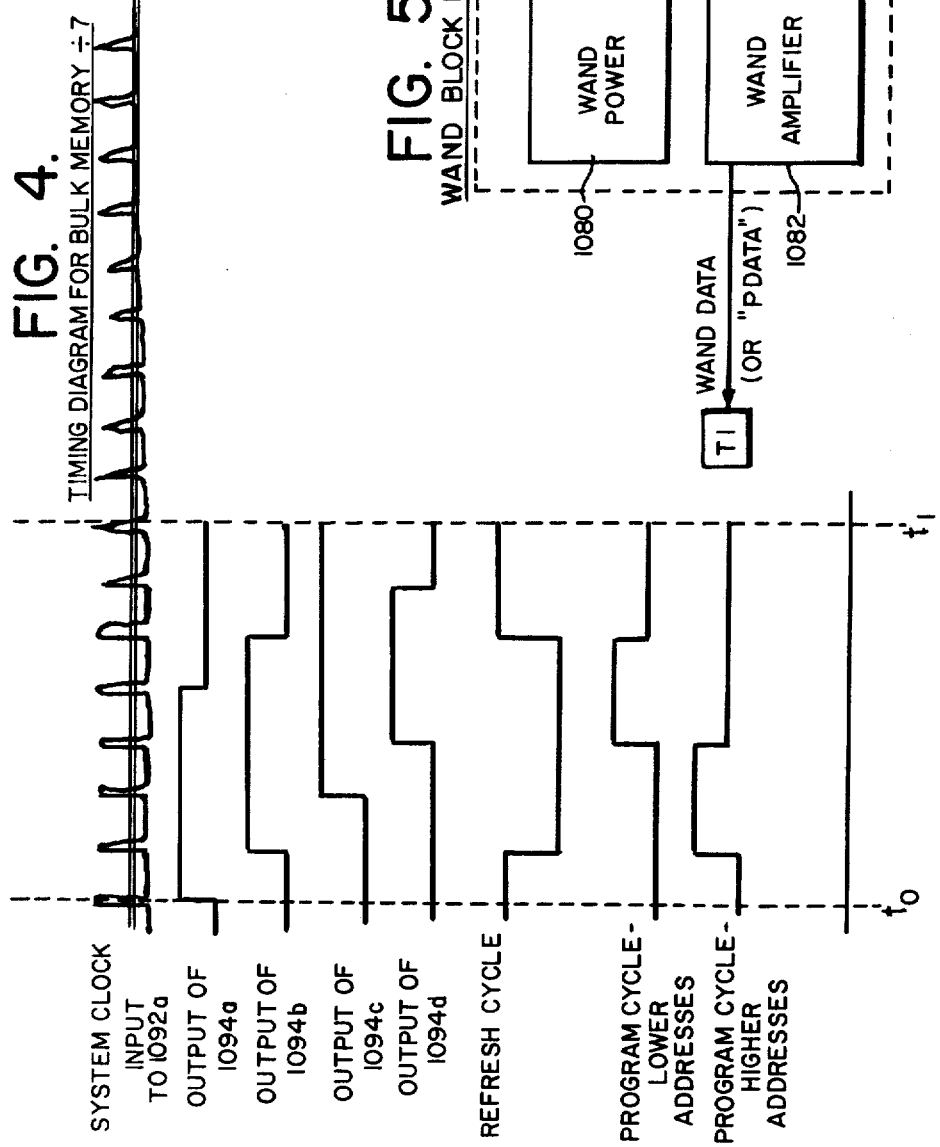

POWER BLOCK DIAGRAM

DISPLAY BLOCK DIAGRAM

FIG. 9. DISPLAY DRIVER CIRCUIT

SEGMENT

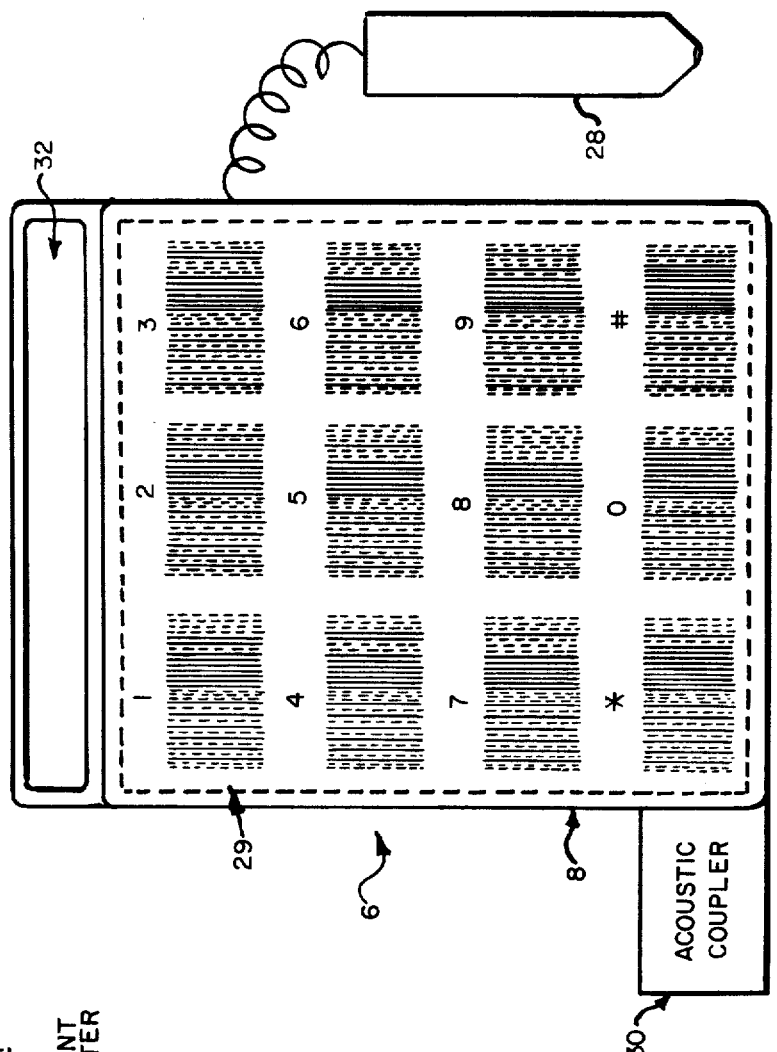
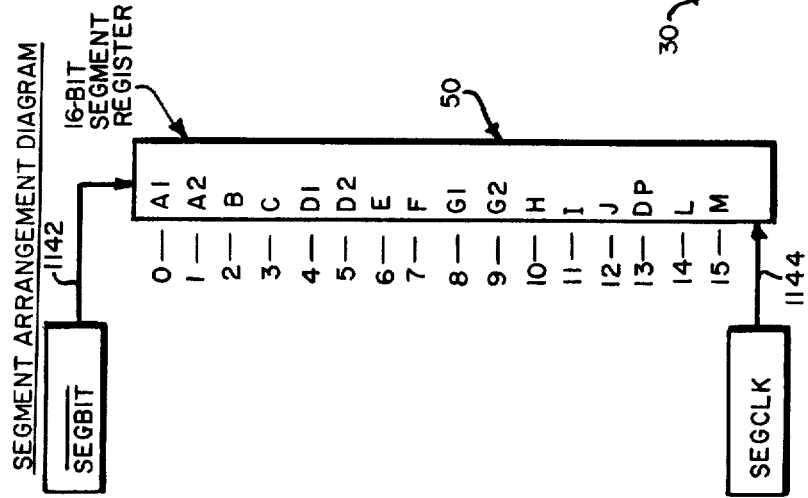

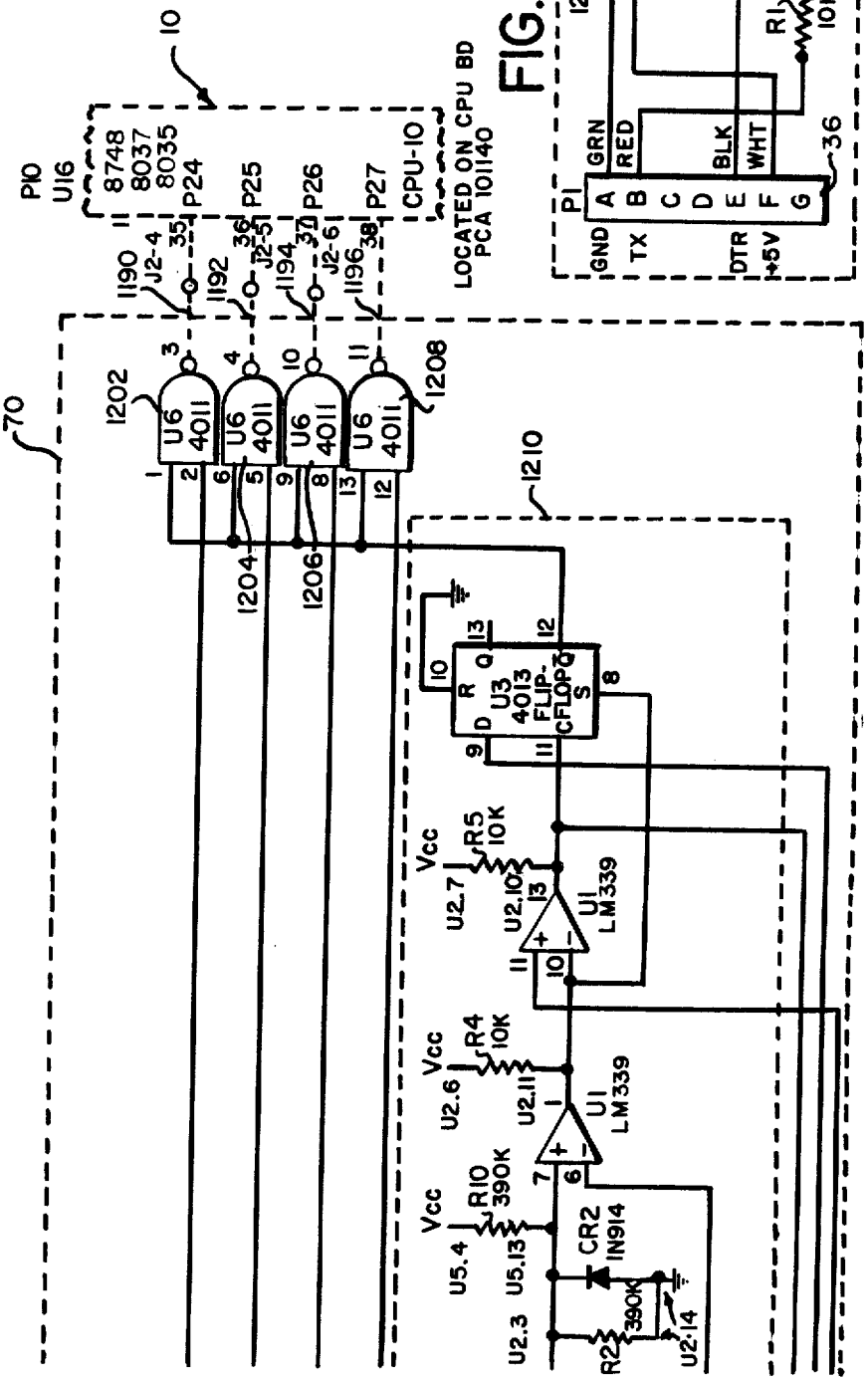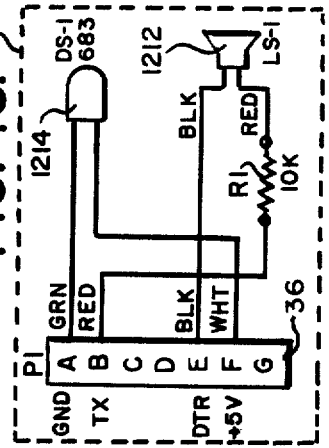

FIG. 18.
ASCII Character Set Table

| HEX | | | | | p=1 | 8 | 9 | A | B | C | D | E | F |
|---|---|---|---|---|---|---|---|---|---|---|---|---|---|
| | | | MSD | | p=0 | 0 | 1 | 2 | 3 | 4 | 5 | 6 | 7 |
| | | | | | b8 | p | p | p | p | p | p | p | p |
| | BITS | | | | b7 | 0 | 0 | 0 | 0 | 1 | 1 | 1 | 1 |
| | | | | | b6 | 0 | 0 | 1 | 1 | 0 | 0 | 1 | 1 |
| LSD | b4 | b3 | b2 | b5/b1 | | 0 | 1 | 0 | 1 | 0 | 1 | 0 | 1 |
| 0 | 0 | 0 | 0 | 0 | | NUL | DLE | SP | 0 | @ | P | ` | p |
| 1 | 0 | 0 | 0 | 1 | | SOH | DC1 | ! | 1 | A | Q | a | q |
| 2 | 0 | 0 | 1 | 0 | | STX | DC2 | " | 2 | B | R | b | r |
| 3 | 0 | 0 | 1 | 1 | | ETX | DC3 | # | 3 | C | S | c | s |
| 4 | 0 | 1 | 0 | 0 | | EOT | DC4 | $ | 4 | D | T | d | t |
| 5 | 0 | 1 | 0 | 1 | | ENQ | NAK | % | 5 | E | U | e | u |
| 6 | 0 | 1 | 1 | 0 | | ACK | SYN | & | 6 | F | V | f | v |
| 7 | 0 | 1 | 1 | 1 | | BEL | ETB | ' | 7 | G | W | g | w |
| 8 | 1 | 0 | 0 | 0 | | BS | CAN | ( | 8 | H | X | h | x |
| 9 | 1 | 0 | 0 | 1 | | HT | EM | ) | 9 | I | Y | i | y |
| A | 1 | 0 | 1 | 0 | | LF | SUB | * | : | J | Z | j | z |
| B | 1 | 0 | 1 | 1 | | VT | ESC | + | ; | K | [ | k | { |
| C | 1 | 1 | 0 | 0 | | FF | FS | , | < | L | \ | l | \| |
| D | 1 | 1 | 0 | 1 | | CR | GS | - | = | M | ] | m | } |
| E | 1 | 1 | 1 | 0 | | SO | RS | . | > | N | ^ | n | ~ |
| F | 1 | 1 | 1 | 1 | | SI | US | / | ? | O | _ | o | DEL |

STARTUP AND TEST MODE FLOWCHART

START-UP CONFIRMATION

DAY OF WEEK SELECTION

ID/DEMO SELECTION

ID/DEMO LABEL BUILD

DAY OF WEEK CONFIRMATION

STORE ID SELECTION

CONFIRM STORE ID

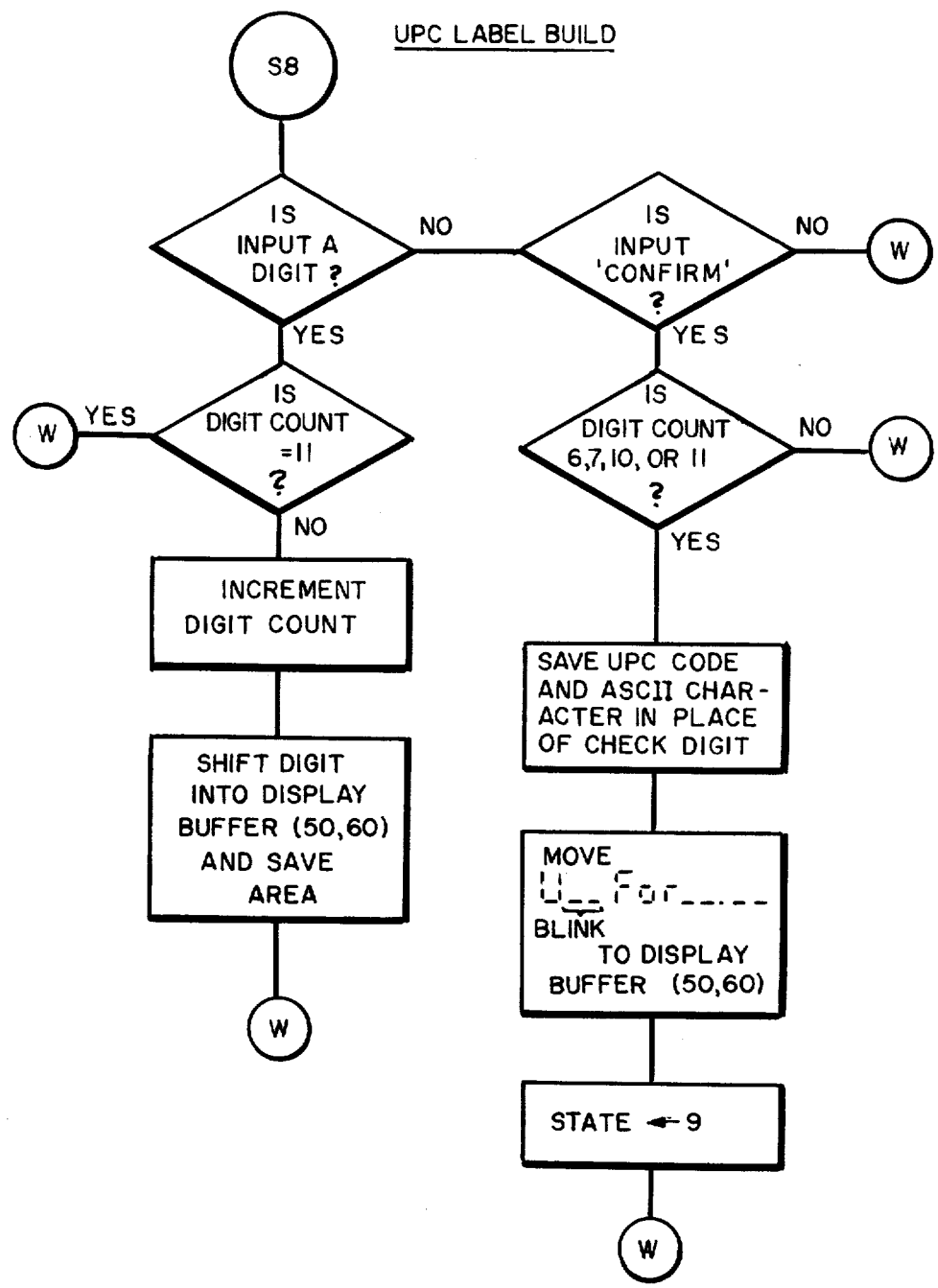

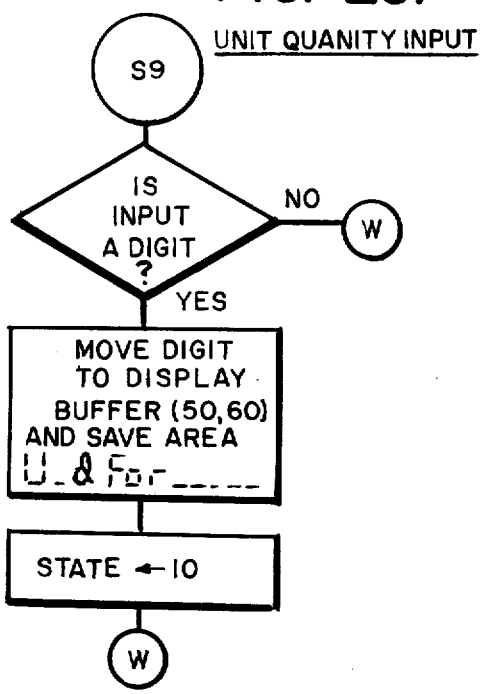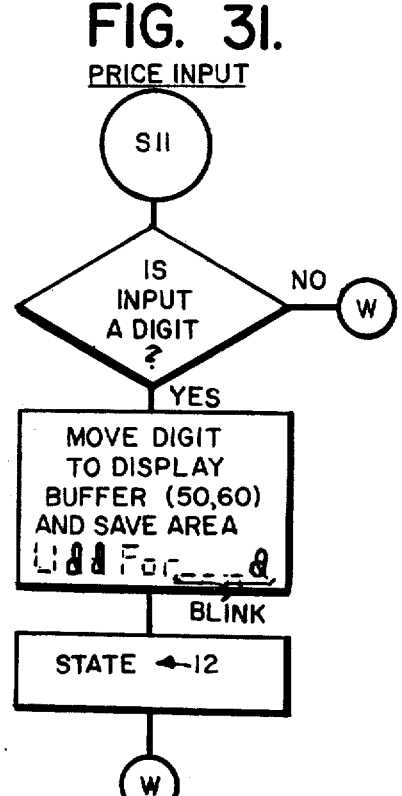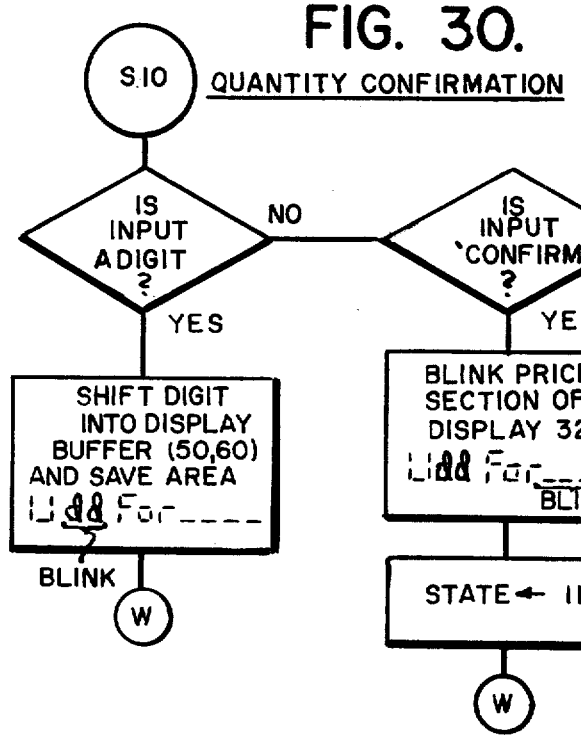

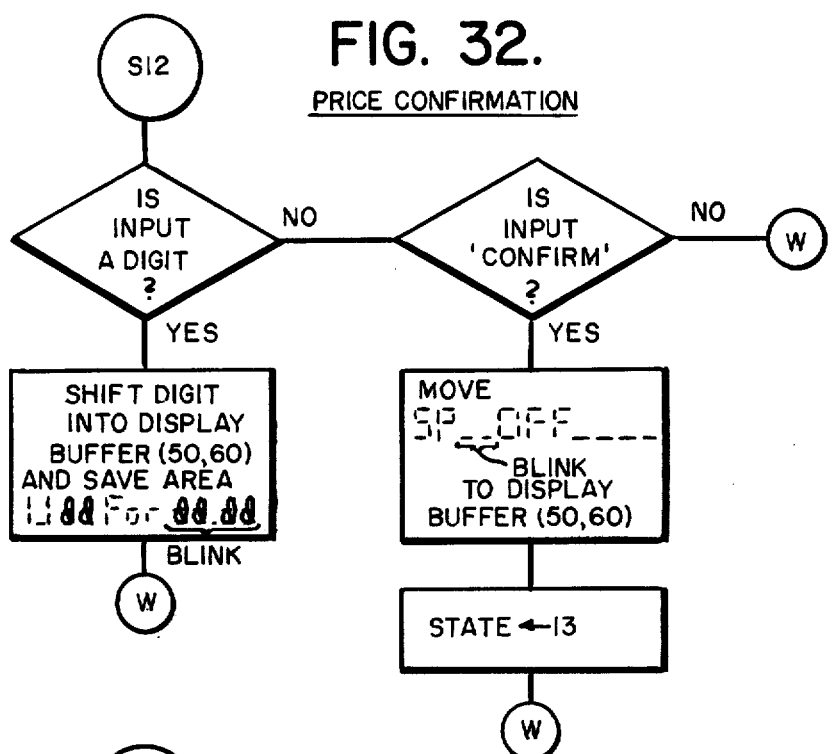
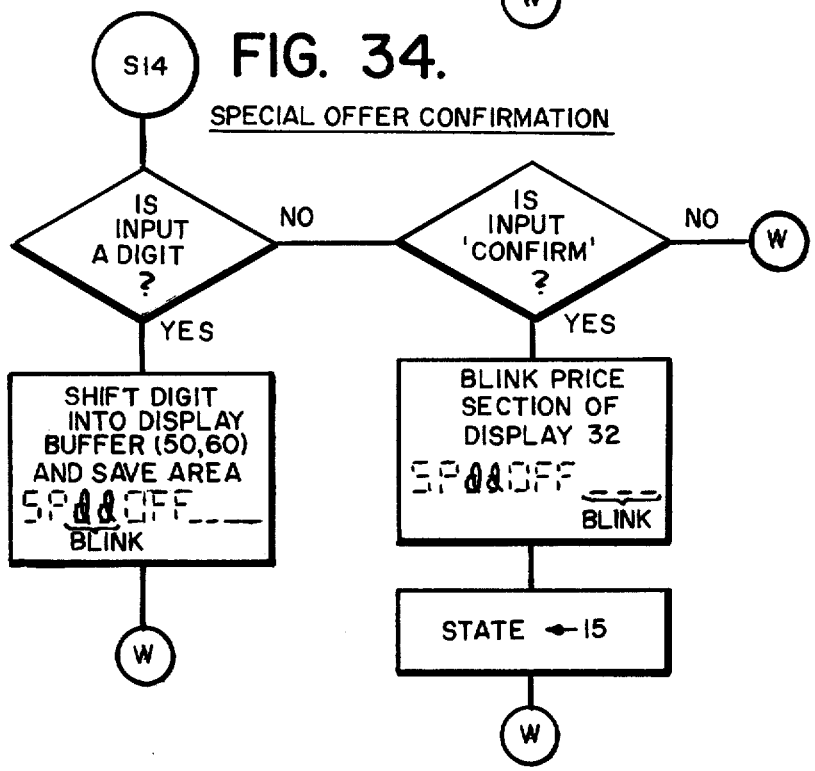

SPECIAL OFFER INPUT

TERMINATE UPC OR STORE INPUT

TRANSMIT CONFIRMATION

MEMORY ERASE CONFIRMATION

TRANSMIT OR ERASE CHOICE

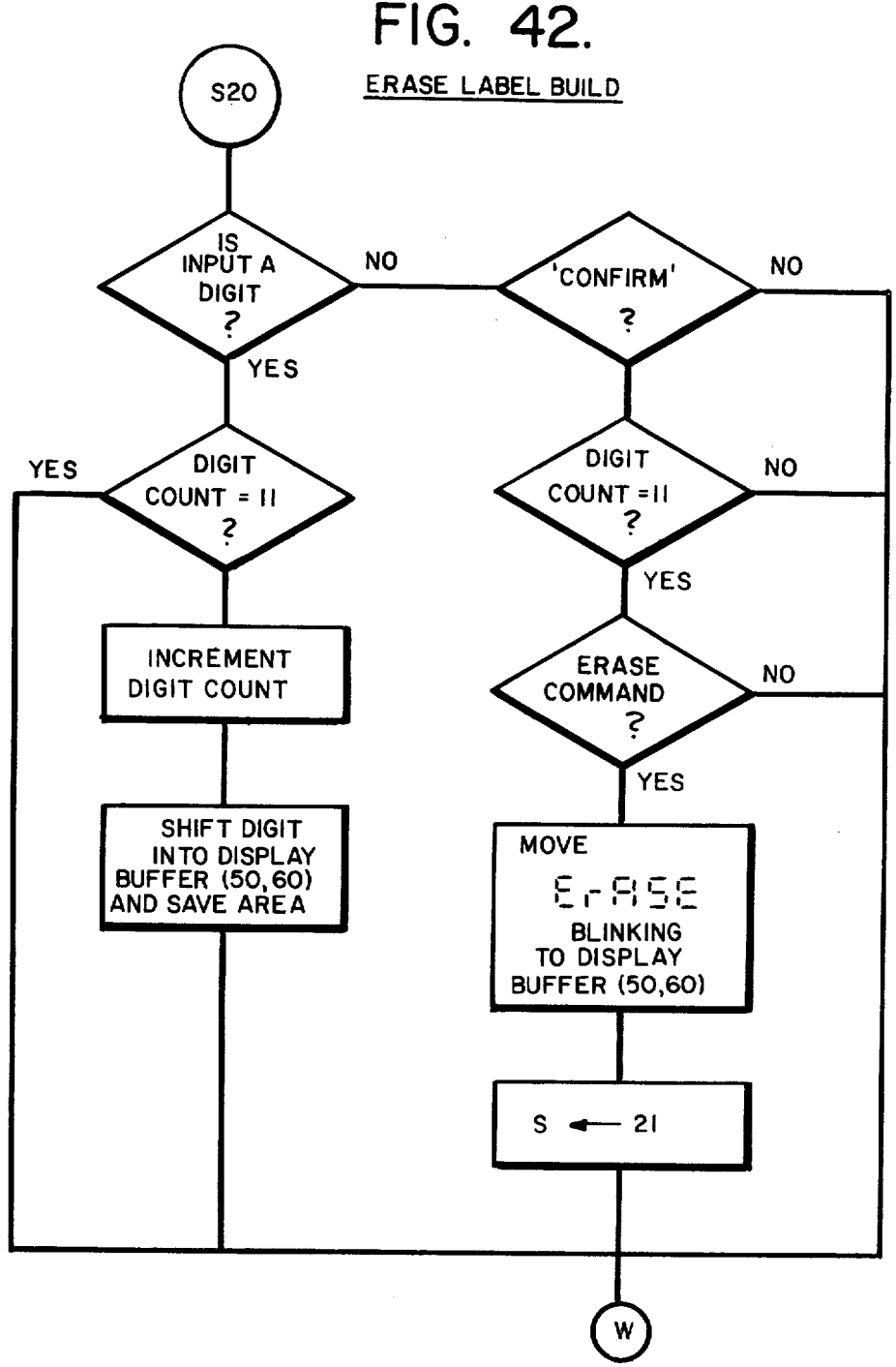

DISPLAY STATE SUMMARY

| STATE | DISPLAY 32 |
|---|---|
| S 0 | 8888888888 |
| S 1 | HELLo |
| S 2 | dddddddddd |
| S 3 | dAY |
| S 4 | dAY    d |
| S 5 | StorE |
| S 6 | StorE    dd |
| S 7 | UPC |
| S 8 | dddddddddd |
| S 9 | U__For___.__ (BLINK) |
| S 10 | Udd For___.__ (BLINK) |
| S 11 | Udd For___.__ |
| S 12 | Udd For dd.dd (BLINK) |
| S 13 | SP_oFF___.__ (BLINK) |
| S 14 | SPdd oFF___.__ (BLINK) |
| S 15 | SPdd oFF___.d (BLINK) |
| S 16 | UPC or StorE (BLINK) |
| S 17 | dddddddd |
| S 18 | Go (BLINK) |
| S 19 | Go or ErASE (BLINK) |
| S 20 | dddddddd |
| S 21 | ErASE ? (BLINK) |

NOTE d = DISPLAY DIGIT

INPUT SERVICE ROUTINE

MARKET SURVEY DATA COLLECTION METHOD

TECHNICAL FIELD

The present invention relates to a method for independently, electronically collecting market survey data for temporary storage thereof at diverse locations for subsequent transmission thereof from such diverse locations over a telephone type link for accumulative processing at a remote data processor.

BACKGROUND ART

Market survey data collection systems are well known in the art. One of the more common prior art systems for collecting such data involves the use of survey booklets or questionnaires which are mailed to a diverse group of panelists, individually handwritten into by the panelists to record the survey data relating to their particular shopping habits for various identified products, mailed back to the survey company by the panelists where the data is keypunched and then read into a data processor or computer for accumulative processing of all of this data. This procedure, although satisfactory under most circumstances, is time consuming, costly and provides many opportunities for erroneous data entry due to carelessness either by the panelist who is writing in the data by hand or by the keypunch operator who is subsequently encoding the handwritten data. With the advent of electronic inventory control and supermarket scanners there has been considerable interest in bringing market data collection into the electronic age. An example of such prior art attempts is disclosed in U.S. Pat. Nos. 3,942,157 and 4,016,542 which relate to electronic notebooks, such as marketed under the name SCOREPAD by Azurdata Inc., for electronically collecting data, such as for inventory control, for subsequent transmission to a central computer. SCOREPAD terminals also employ a scanning wand in certain instances for inputting UPC product code type data. However, to applicants' knowledge, such a system has not been employed in connection with electronic collection of market survey data from diverse panelists, such as in the home, nor do such systems employ an interactive prompt message sequence, such as one responsive to confirmation of proper data entry in order to minimize the potential for erroneous data entry.

The use of scanning wands or optical readers, because of the standardized UPC product codes, has become popular in electronic inventory control systems in an effort to both minimize error and accelerate entry of UPC and other types of product code data. An example of such prior art scanning systems is disclosed in U.S. Pat. Nos. 4,118,687 and 3,665,164, both of which are point-of-sale type systems and neither of which is involved with independent electronic data collection from diverse panelists for accumulative central processing, such as where the independent data collection is in response to an interactive prompt message sequence, such as one responsive to confirmation of proper data entry in order to minimize the potential for erroneous data entry. Other prior art OCR scanning systems, per se, by way of example, are disclosed in U.S. Pat. Nos. 4,143,358; 4,088,981; 3,826,900; 3,798,421; 3,752,958; 3,717,750; 3,760,162; 4,025,766 and 3,876,863 while U.S. Pat. Nos. 4,072,859 and 4,158,194 disclose prior art systems similar to U.S. Pat. No. 4,118,687. None of these prior art data collection systems known to applicants, however, employ an optical scanner as the sole data input device for both UPC product code type data and supplementary market survey data, nor employs the aforementioned prompt message interaction within the data base.

Thus, despite the widespread use of electronics over at least the past ten years in connection with market type data and despite the problems inherent in the conventional market survey data collection methods employing handwritten questionnaires, no satisfactory prior art system or method known to applicants has been developed which enables rapid collection at a central location of market survey data independently collected at a plurality of diverse locations for accumulative processing with minimal error potential.

These disadvantages of the prior art are overcome by the present invention.

DISCLOSURE OF THE INVENTION

The present invention relates to a method for independently electronically collecting related market survey data from a plurality of diverse locations for temporary storage at each of the independent diverse locations where the data is collected for subsequent transmission thereof from the independent diverse locations over a telephone type link for accumulative processing thereof at a remote central electronic data processor. The method at each of the independent data collection locations includes the step of electronically independently displaying an interactive changeable prompt message display on a visual display device indicating a particular one of a plurality of market survey information categories in a predefined sequence of these categories. A market survey data input signal, which comprises an actual data input corresponding to the particular displayed category, is provided to a buffer storage in response to the interactive prompt message display. This provided signal is selectively interactively processed in a microcomputer in accordance with the predefined sequence. The actual data input from the buffer storage is displayed on the visual display device, such as an alphanumeric display device, in order to enable verification of the correctness of the input in which instance a confirmation command input signal may then be provided to the microcomputer. The content of the buffer storage is temporarily stored in a static memory in response to the confirmation command input signal, with the visual display being changed so as to display the next prompt message in the sequence. The sequence defines a market survey data transaction expository of each product with the interactive sequence recycling for each market transaction for enabling independent integral storage for each product transaction at the diverse location. The market survey data is input via optical scanning of both a UPC product code and a barboard array of such codes or via optical scanning in conjunction with a keyboard input. In order to transmit the stored data to the remote central data processor, the static memory is acoustically coupled to the telephone type link via a telephone handset to provide a digital data transmission signal on a character by character basis. A FULL memory prompt message display is provided and further storage in the static memory is disabled when the static memory contains insufficient storage space for storage of a complete market transaction for a product. The sequence may be directly advanced to provide the next corresponding prompt message display in response to provision of a confirmation command input signal during a prompt message display so that inapplicable product categories may be omitted. Thus, in accordance with the above method, subsequently transmitted market survey data may be rapidly independently collected at a central location from a plurality of independent diverse locations for accumulative processing thereof with minimal error potential, such as resulting from the prompting sequence interaction with the data base and the required verification of data being input. Moreover, the prompting sequence guarantees the completeness of the data since the prompting will preferably not advance the sequence without a data entry.

BRIEF DESCRIPTION OF DRAWINGS

FIG. 4 is a timing diagram of the divide-by-7 circuit portion of the bulk memory of FIG. 3;

FIG. 5 is a block diagram of the wand control portion of the system of FIG. 1;

FIG. 9 and 10 are logic schematic diagrams of the display portion illustrated in FIG. 8;

FIGS. 11 and 12 are diagrammatic illustrations of the segment arrangement of a typical segment display portion of the display of FIG. 8;

FIG. 13 is a plan view of the preferred terminal of the system of FIG. 1 illustrating a typical preferred barboard layout;

FIGS. 15A and 15B constitute a logic schematic diagram of the keyboard circuit portion of the system of FIG. 1 assuming the terminal of FIG. 14 is employed;

FIG. 16 is a schematic diagram of the acoustic coupler portion of the system of FIG. 1;

FIG. 18 is a chart of a typical ASCII character set employed in the system of the present invention;

FIGS. 19–43, and 45 comprise a logic flow diagram of the interactive market survey control functions of the system of FIG. 1; and FIG. 44 is a graphic illustration of the various display states referred to in the logic flow diagram of FIGS. 19–43 and 45.

BEST MODE FOR CARRYING OUT THE INVENTION

Figure 1:
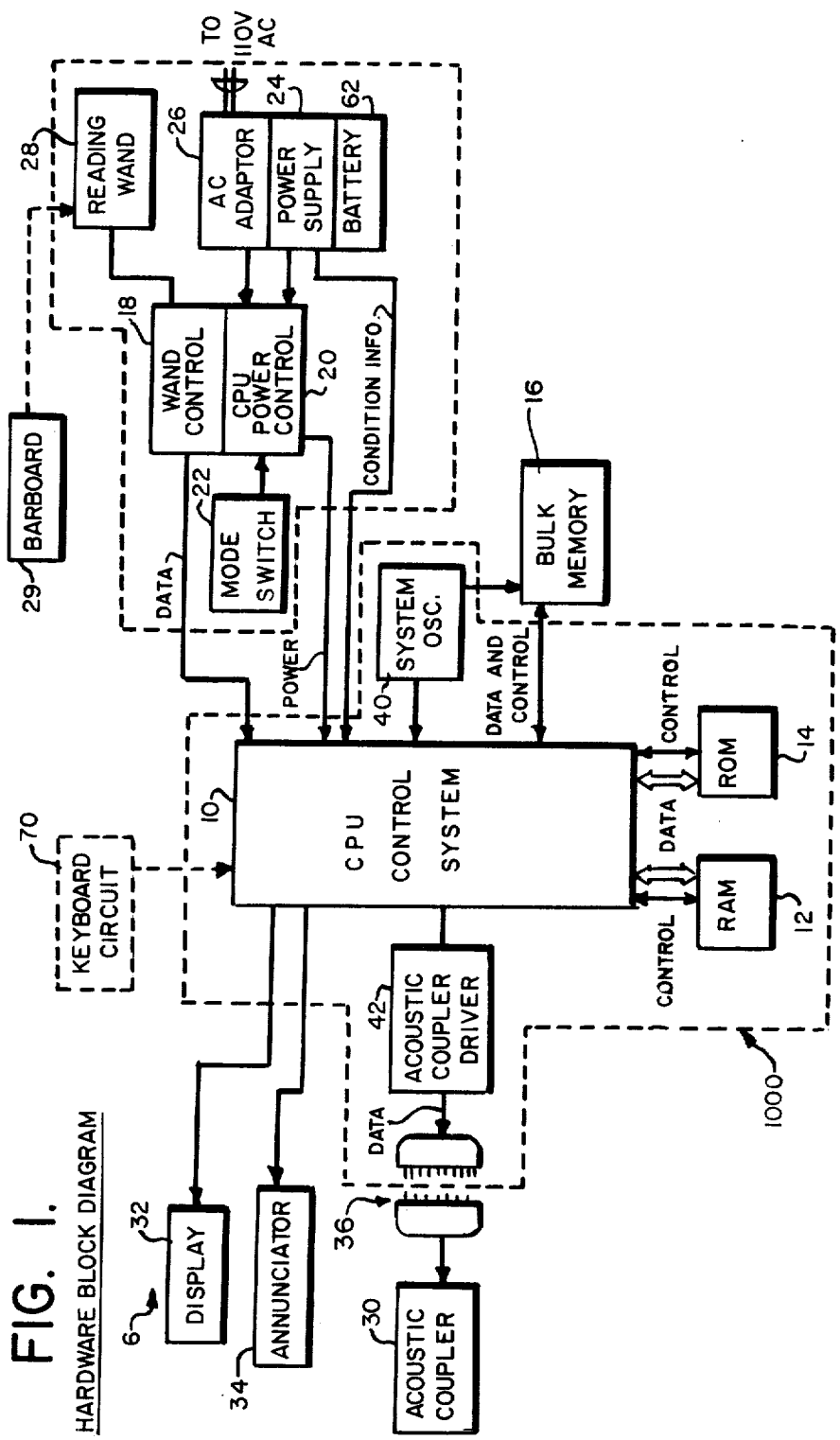
FIG. 1 is a functional block diagram of a preferred embodiment of the market survey data collection system of the present invention.
Figure 2A:
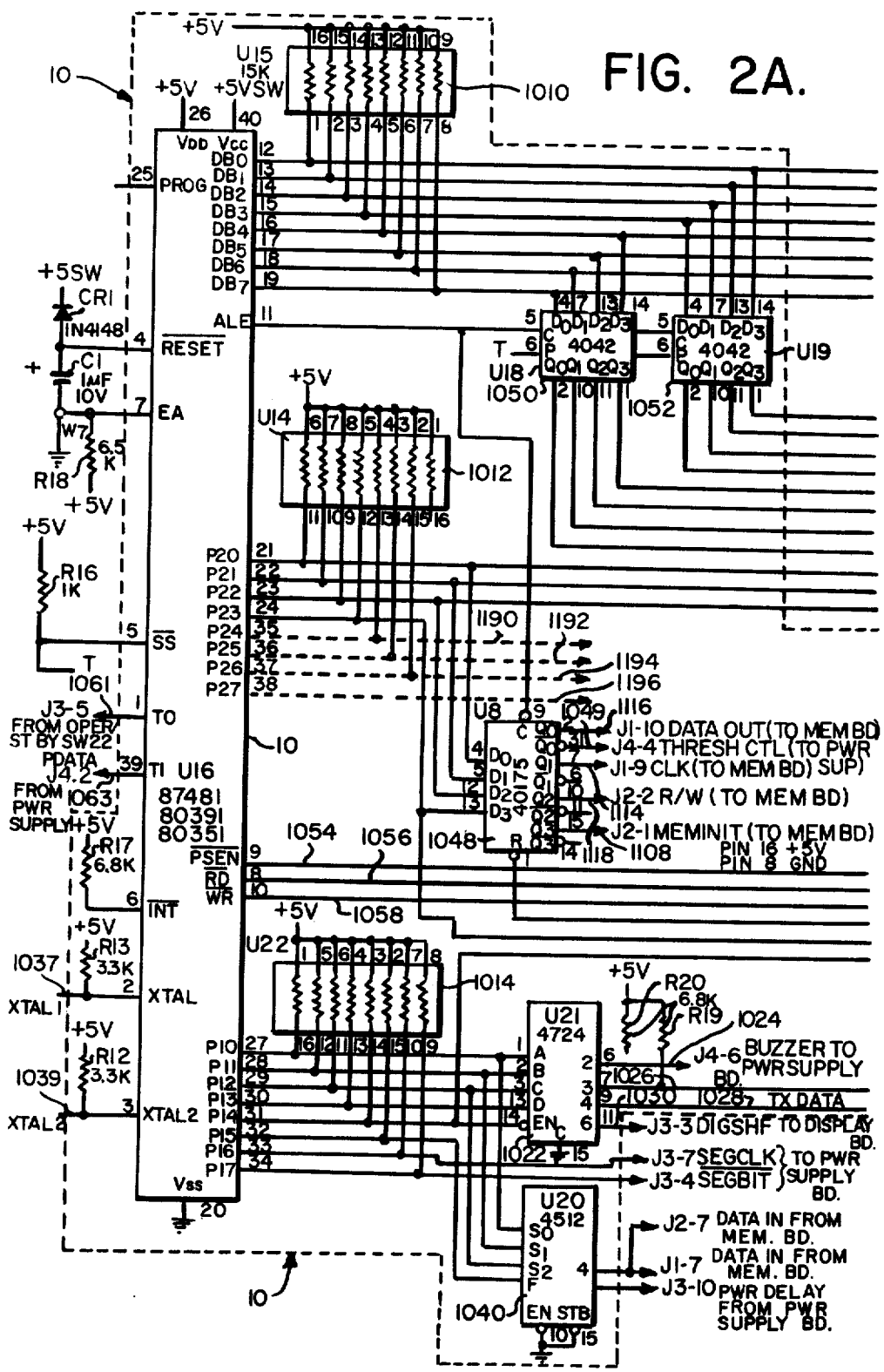
FIGS. 2A and 2B constitute a logic schematic diagram of the microprocessor control portion of the system of FIG. 1.
Figure 2B:
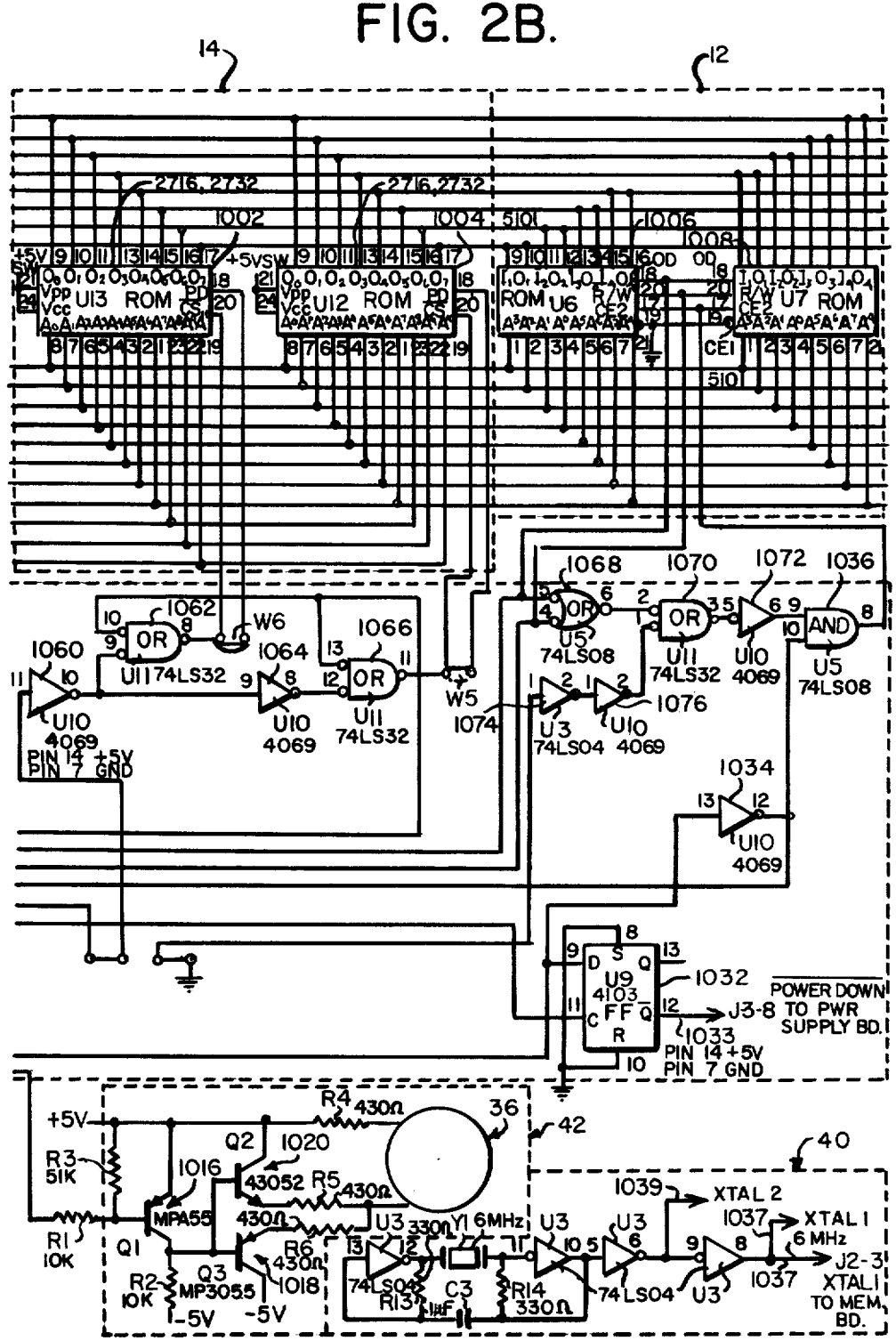

Referring now to the drawings in detail and initially to FIGS. 1, 2 and 13, a preferred embodiment of the market survey data collection system of the present invention, generally referred to by the reference numeral 6, is shown. As shown and preferred in FIG. 13, market survey data collection system 6 is preferably configured as a terminal 8 (FIG. 13) which is preferably of the size of a desk top calculator. As shown and preferred in FIG. 13, by way of example, the terminal 8 contains two portions 28 and 29 which, as will be described in greater detail hereinafter, act as market survey data input devices for the system 6 and two portions 30 and 32 which act as information output devices for the system 6. In the embodiment of FIG. 13, the information input devices 28 and 29 are a conventional optical character reading wand 28, such as an Intermes Model 1240, and a barboard 29 which is optically read by wand 28. Barboard 29 preferably contains the numbers 0 through 9 and the symbols * and # each being represented by unique UPC bar code numbers such as employed in UPC version A Number System 1, with the arrangement of these bar code numbers preferably being in the format of a standard Touch-Tone telephone keyboard array. As will be explained in greater detail with reference to FIG. 14, if desired the barboard 29 may be replaced by a conventional keyboard 69 forming part of a keyboard circuit 70 illustrated in greater detail in FIG. 15, in which instance rather than using the optical character reading wand 28 to input all information, the optical character reading wand 28 would be used to input UPC product codes while the keyboard 69 would be used to input supplementary market survey data and/or UPC product code information. In the embodiment of FIG. 13 the appropriate numbers and/or symbols on the barboard 29 are preferably scanned by the optical character reading wand 28 to input supplementary market survey data and/or UPC product code information with the wand 28 also preferably being used to scan UPC product code information contained on the products being surveyed. The aforementioned output devices 30 and 32, which will be explained in greater detail hereinafter, preferably consist of an alphanumeric display 32 which preferably displays both prompt messages as well as verification of the market survey data being input to the system 6 via the wand 28 and barboard 29 or keyboard 69, and an acoustic coupler 30, to be described in greater detail hereinafter with reference to FIG. 16, which is preferably employed to transmit the market survey data stored in terminal 8 from the terminal 8 to a remote computer (not shown) for processing via conventional telephone lines (not shown).

Referring now specifically to FIGS. 1 and 2, FIG. 1 is a functional block diagram of the system 6 contained within terminal 8, the system 6 preferably including a microprocessor control portion 1000, illustrated in greater detail in FIG. 2, which supervises the interactive functions of the system 6 such as providing appropriate prompting messages to the user dependent on the market survey data information or operation desired and the data input provided by the user as well as controlling the transmission and storage of market survey data in the system 6. The microprocessor control portion 1000 preferably includes a central processing unit or microprocessor 10, such as preferably an Intel 8048, 8748 or 8039, depending on the program memory requirements. As shown and preferred in FIGS. 1 and 2, microprocessor 10 is preferably provided with an additional 4K of ROM 14, such as a pair of Intel 2716 or 2732 ROMs, given reference numerals 1002 and 1004 in FIG. 2, and 512 bytes of RAM 12, such as Intel 5101 RAMs, given reference numerals 1006 and 1008 in FIG. 2, all of which are externally connected to the internal ROM and RAM normally contained on the Intel microprocessor chip 10. External ROM 14 and external RAM 12 are preferably provided to increase the program and data memory space, respectively, of the microprocessor chip 10. In addition, as shown and preferred in FIG. 2, conventional pull-up resistors 1010, 1012, 1014 are associated with the output of microprocessor chip 10. The microprocessor chip 10 normally takes significantly more power than most of the other components associated with the system 6, and, preferably, microprocessor chip 10 is preferably shut down while the system 6 or terminal 8 is idle; that is while data is being neither input nor output from the system 6. As shown and preferred in FIGS. 1 and 2, the microprocessor control portion 1000 also preferably includes a system oscillator or clock 40 which preferably provides a system clock signal such as a 6 MHz clock input, by way of example, to microprocessor chip 10 via paths 1037 and 1039. In addition, microprocessor control portion 1000 also preferably includes an acoustic coupler driver 43 for driving acoustic coupler 30 so as to enable transmission of data stored in the RAM 12 over conventional telephone lines to the previously mentioned remote computer (not shown) for processing. The acoustic coupler driver 42 is shown in greater detail in FIG. 2 and preferably comprises a pair of PNP transistors 1016 and 1018 and an NPN transistor 1020. The bases of transistors 1018 and 1020 are tied to the collector of transistor 1016 and the emitters of transistors 1018 and 1020 are tied together to one end of a connector 36 which connects to acoustic coupler 30 while the other end of the connector 36 is tied to the collector of transistor 1020, with the output line being labeled TXDATA. The acoustic coupler 42 preferably changes the signal provided thereto from the output of the microprocessor 10 from a signal having a 0-to-5 volt level to a signal to the acoustic coupler 30 to a signal having a signal level of between +5 volts and −5 volts.

Figure 7A:
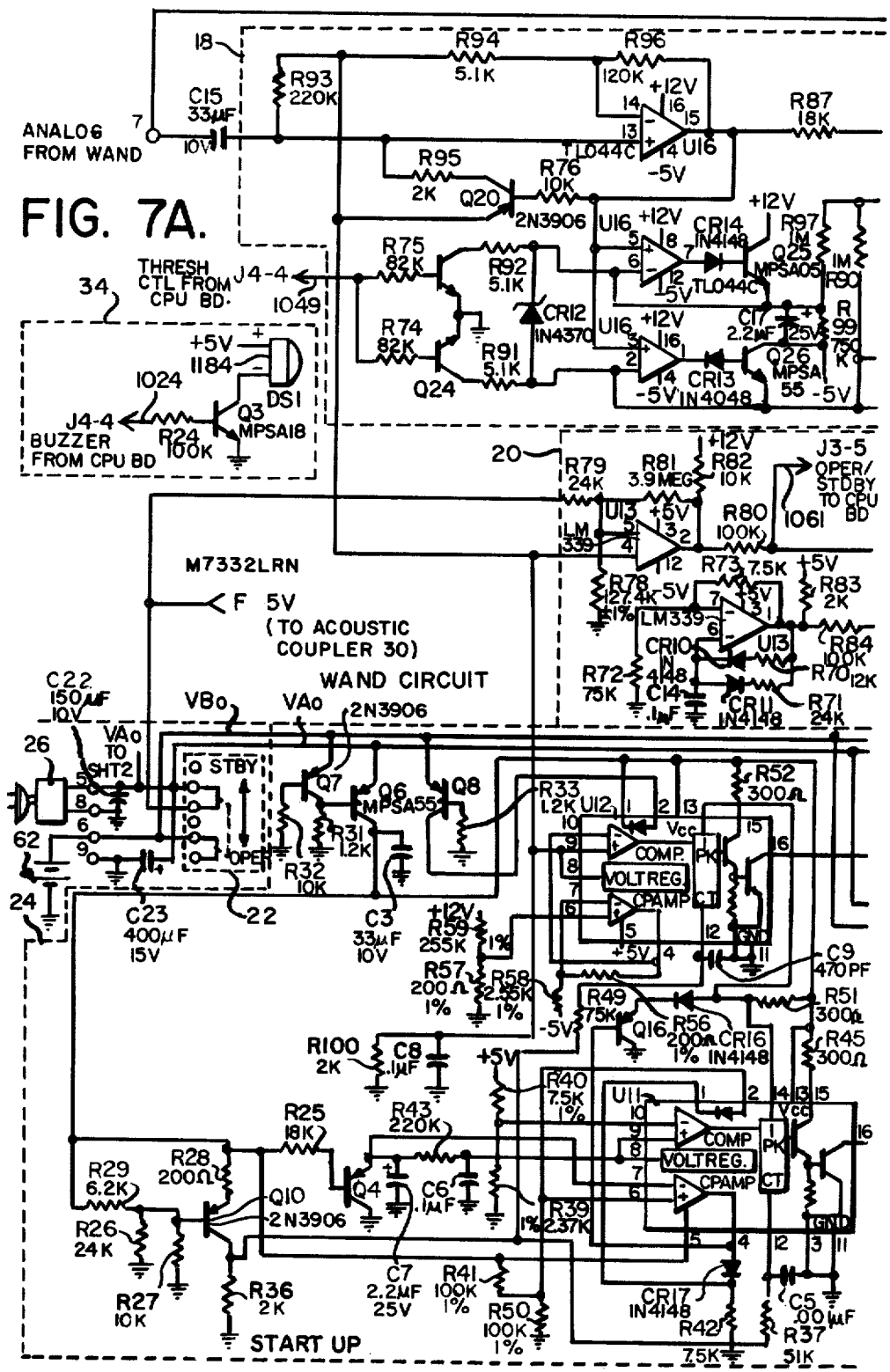
FIGS. 7A and 7B constitute a logic schematic diagram of the wand control and power supply portions of FIGS. 5 and 6.
Figure 7B:
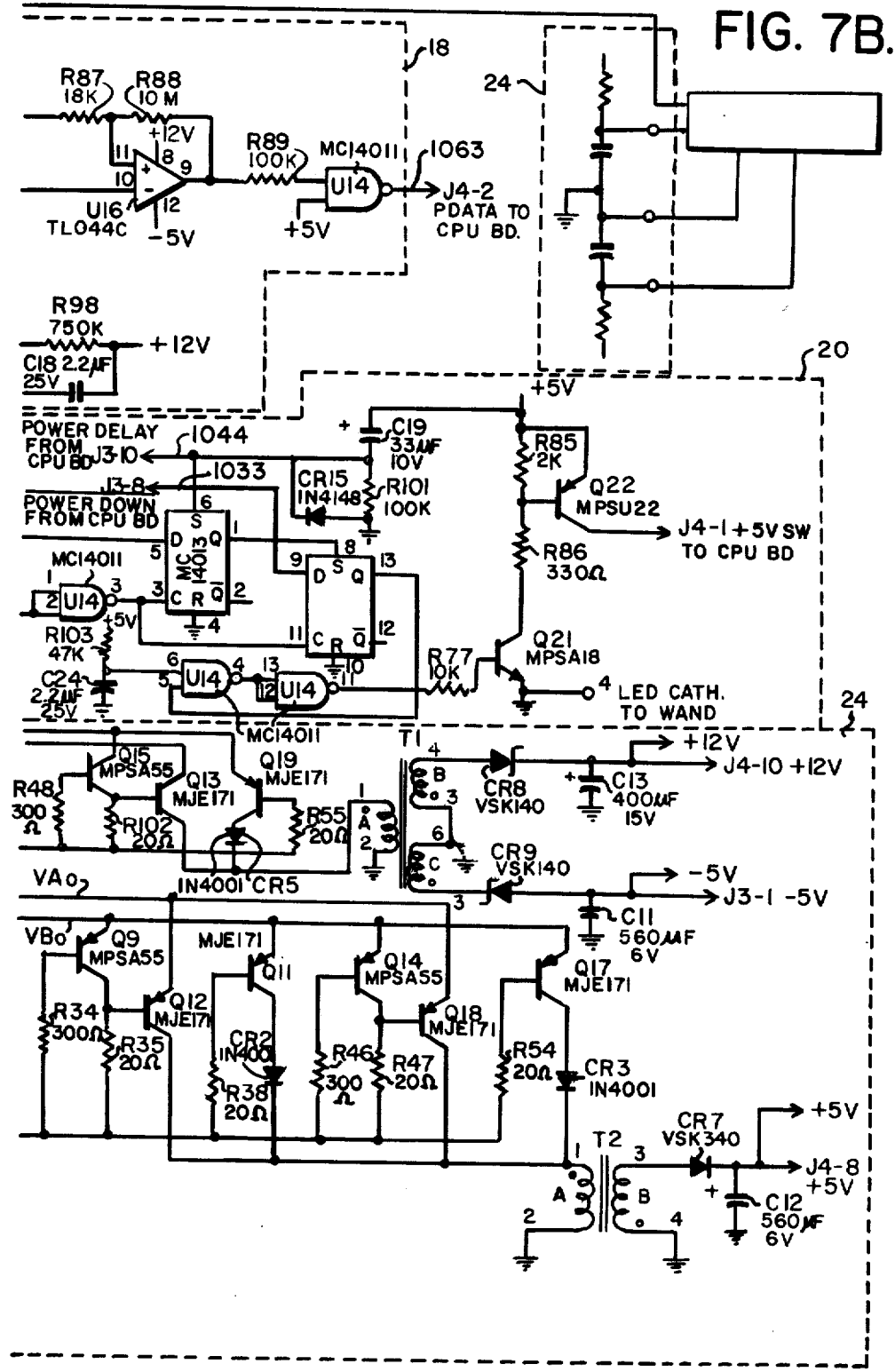

As further shown and preferred in FIG. 2, the input to acoustic coupler driver 42, which is the signal provided to the base of transistor 1016, is provided as one output of a conventional one-line-to-eight-line output multiplexer 1022 connected to the output of microprocessor chip 10. Output multiplexer 1022 conventionally provides an output to one of eight possible paths; however, in the preferred embodiment illustrated in FIG. 2 only four such output lines or paths 1024, 1026, 1028 and 1030 are employed. Output path 1024 provides a buzzer signal to an annunciator 34 (FIGS. 1,7), such as for indicating an error condition or acknowledging of a confirm (*) command as will be described in greater detail hereinafter. Output path 1026 provides a signal to a conventional flip-flop 1032 acting as a latch to latch the power down via path 1033, with output path 1026 being connected in parallel to the D input to flip-flop 1032 and to the input to an inverter 1034 whose output is provided as one input to a conventional two input AND gate 1036 whose output is, in turn, provided to RAMs 1006 and 1008. Output path 1028 is the aforementioned data line labeled TXDATA which is connected to the input to acoustic coupler driver 42 at the base of transistor 1016. Lastly, output path 1030 is provided to the display circuitry (FIGS. 8,9,10) and is a signal labeled DIGSHF. Output multiplexer 1022 may preferably be a conventional multiplexer such as a Fairchild 4724. Similarly, a conventional input multiplexer 1040 is provided which is preferably an eight-line-to-one-line multiplexer connected in parallel to the input to output multiplexer 1022 and to the inputs to the microprocessor chip 10. However, as with output multiplexer 1022, not all of the input lines to multiplexer 1040 are employed, with preferably only two such input lines 1042 and 1044 being employed. Input line 1042 preferably provides the data input from the memory circuitry which comprises a bulk memory 16 to be described in greater detail hereinafter with reference to FIG. 3, and input line 1044 preferably provides the POWER DELAY signal from the power supply circuitry (FIG. 7) such as from the CPU power control 20 illustrated in greater detail in FIG. 7. Various control signals, which will be described in greater detail hereinafter with reference to FIGS. 19–45, are output from microprocessor chip 10 to other portions of the system 6 via a conventional QUAD latch 1048, such as a Fairchild 40175 with these control signals including the signal labeled DATA OUT, CLK, $\overline{R/W}$ and MEMINIT, all of which are provided to the bulk memory 16 as will be described in greater detail hereinafter, and the signal labeled THRESH CTL which is provided to the power supply, such as illustrated in FIG. 7. Thus, this latch 1048 acts as an interface between the microprocessor chip 10 and the memory circuitry or bulk memory 16, and between the microprocessor chip 10 and the power supply. Similarly, a pair of QUAD latches 1050 and 1052, such as Fairchild 4042s are connected as an interface between the ROMs 1002, 1004 and RAMS 1006, 1008 and the microprocessor chip 10. As shown and preferred in FIG. 2, the control signals PSEN, RD and $\overline{WR}$ which are provided as outputs from the microprocessor chip 10 via paths 1054, 1056 and 1058, respectively, are supplied to the external ROM 14 and RAM 12 with the output signal provided via path 1054 being provided to ROMs 1002 and 1004 through conventional gating circuitry 1060, 1062, 1064, 1066 and with the output control signals provided via paths 1056, 1058 being provided to the RAMs 1006 and 1008 via conventional gating circuitry 1068, 1070, 1072, 1074, 1076 which provides one input to AND gate 1036 whose other input is the previously mentioned signal provided via path 1026.

Figure 6:
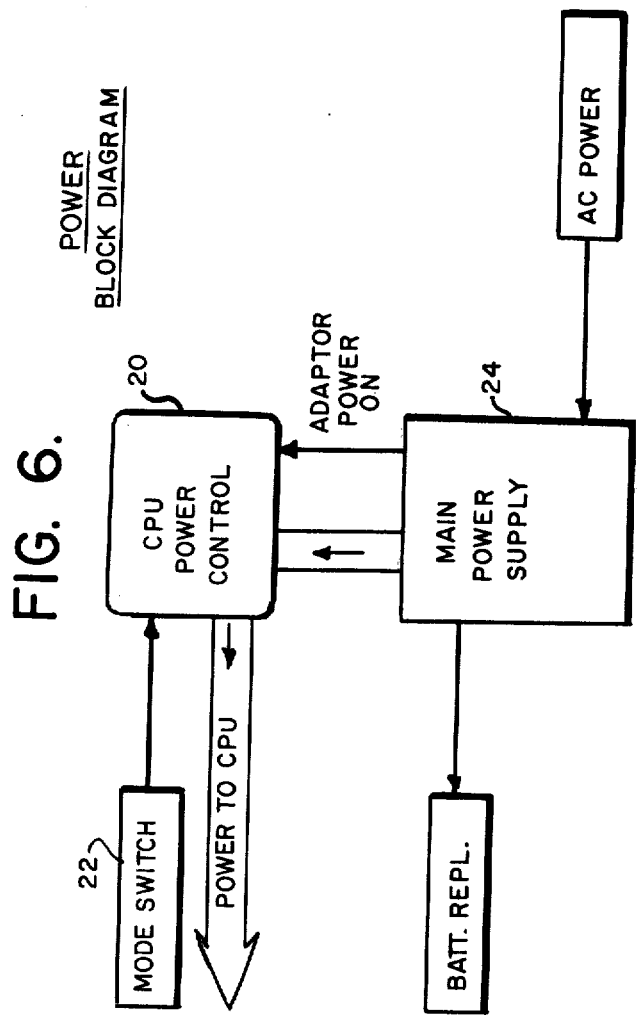
FIG. 6 is a block diagram of the power supply portion of the system of FIG. 1.

As was previously described with reference to FIGS. 13 and 14, an optical character reading wand 28, such an Intermes Model 1240, is preferably employed to input UPC label data to the system 6 as well as, in connection with the embodiment of FIG. 13, to read the barboard 29 and input supplementary data to the system 6. As shown and preferred in FIG. 1, a wand control circuit 18, shown in greater detail in FIG. 7, acts as an interface between the wand 28 and the central processing unit or microprocessor 10. The power control circuitry includes a central processing unit power control 20, also shown in greater detail in FIG. 7, as well as the main power supply 24, an AC adapter 26 for enabling the system 6 to be operated off a standard 110 volt AC wall outlet, and an auxiliary battery supply 62 which provides portability for the terminal 8 as well as insuring retention of stored data in the bulk memory 16 when the terminal 8 is not plugged in. In addition a mode selection switch 22 is preferably provided for selecting between the STANDBY and OPERATE modes of the system 6, to be described in greater detail hereinafter, with the mode or status of the switch 22 being supplied to microprocessor 10 via path 1061. FIG. 5 graphically illustrates the wand control circuit 18 which is shown in greater detail in FIG. 7 as comprising a wand power portion 1080 and a wand amplifier 1082. As shown and preferred in FIG. 7, the wand control circuit 18 output, labeled PDATA, is provided via path 1063 to microprocessor 10. The purpose of the wand control 18 and CPU or microprocessor power control 20 circuits in the system 6 of the present invention is to preferably extend the life of the battery supply 62 as much as possible, particularly since the batteries 62 are responsible for retention of data in the memory 16. Thus, as was previously mentioned, since the central processing unit 10 and the external ROM 14 normally use up a significant amount of power the system 6 preferably is designed to keep the central processing unit 10 shut off as much as possible, with the central processing unit 10 being turned on only when necessary. Although the turn on of the central processing unit 10 could be initiated by a wand read by the wand 28 if desired, under certain circumstances a false signal could be provided since the wand 28 does not normally provide a reliable signal for determining when the wand 28 is on a label surface. In order to avoid such a possibility, the central processing unit power input to the central processing unit power control 20 is preferably controlled by the OPERATE position of the STANDBY/OPERATE mode switch 22. Terminal 8 may be on in either the OPERATE or STANDBY mode as selected by the mode switch 22 with, however, the preferred restriction that the OPERATE mode is only recognized by the central processing unit power control circuit 20 when the AC adapter 26 is live. Whenever the terminal 8 or system 6 is ON, both the internal RAM and the external RAM 12 of the central processing unit 10, the bulk memory 16, and the multiplexer line have power so that as long as the terminal 8 stays ON these will retain their data. Preferably, as the terminal 8 goes from OFF, that is with an unplugged AC adapter 26 and no batteries 62, or from the STANDBY mode to the OPERATE mode, that is with the adapter 26 live and the mode switch 22 being switched to OPERATE, the central processing unit 10 is powered ON and RESET. This power signal arrangement is graphically illustrated in FIG. 6. Of course, preferably each time the microprocessor 10 is powered ON, it must set up the input/output multiplexer lines associated with microprocessor 10 to the desired state. This functional procedure is graphically illustrated in FIGS. 19, 20 and 38 to be described in greater detail hereinafter. With respect to FIG. 7, the various portions 18, 20, 22, 24, 26, 28, 34 and 62 of the wand and power control circuitry function illustrated in FIGS. 1, 5 and 6 are shown in schematic detail. Since the various components thereof are conventional their operation will be readily understood by one of ordinary skill in the art without further explanation. By way of example, exemplary component values have been inserted in FIG. 7 where applicable as well as exemplary indications of conventional logic components to facilitate the understanding thereof.

Suffice it to say that the operation of the reading wand and power control interface with the system 6 may be summarized in the following table:

| READING WAND AND POWER CONTROL INTERFACE TABLE | | |
|---|---|---|
| line | sense | use |
| THRESH | | make it high right after |
| CTL | | hitting the first bar. Make it low as soon as possible after the end of the label. |
| TO | 0=STANDBY 1=OPERATE and AC adapter plugged in | Tells you when the terminal is in the OPERATE condition |
| TI | 0=light surface 1=dark surface | wand data |
| POWER DOWN | 0=power 1=no power | Bring low to guarantee power to the CPU. Make it high to hand control over to the OPERATE switch. |
| PWR DELAY | 1=just switched on 0=on for over 1 sec. | After a RESET, if this is a "1" it's an initial POWER ON, if it is a "0", then the wand circuit has just brought the CPU up from STANDBY (power down) |

As further shown and preferred in FIG. 1, the aforementioned bulk memory 16 is provided for storage of product label market survey data which may be optically read with the wand 28 and may preferably be, for example, as large as 32K 8-bit bytes, in 8K chunks. The RAM 12 and bulk memory 16 are preferably powered by batteries 62 when they are present in the system 6 and the unit 8 is not plugged in, and by appropriately modified AC power whenever the AC adaptor 26 is plugged into a live wall outlet. As was previously mentioned, whenever the system 6 is ON, both the external RAM 12 and the internal RAM, the bulk memory 16 and the multiplexer lines have power so that as long as the system 6 or terminal 8 stays ON, they will retain the data stored therein.

Figure 3A:
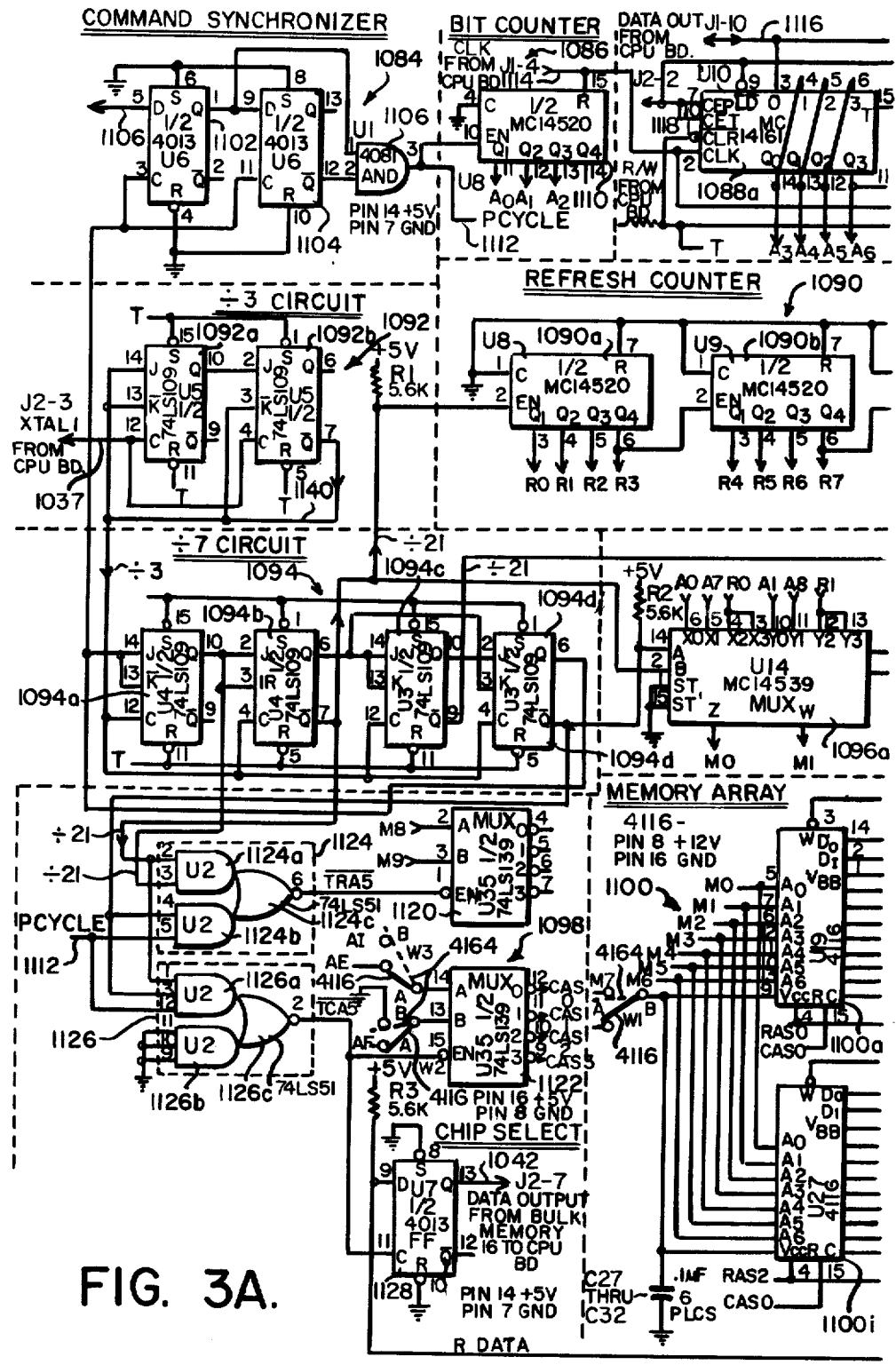
FIGS. 3A and 3B constitute a logic schematic diagram of the bulk memory portion of the system of FIG. 1.
Figure 3B:
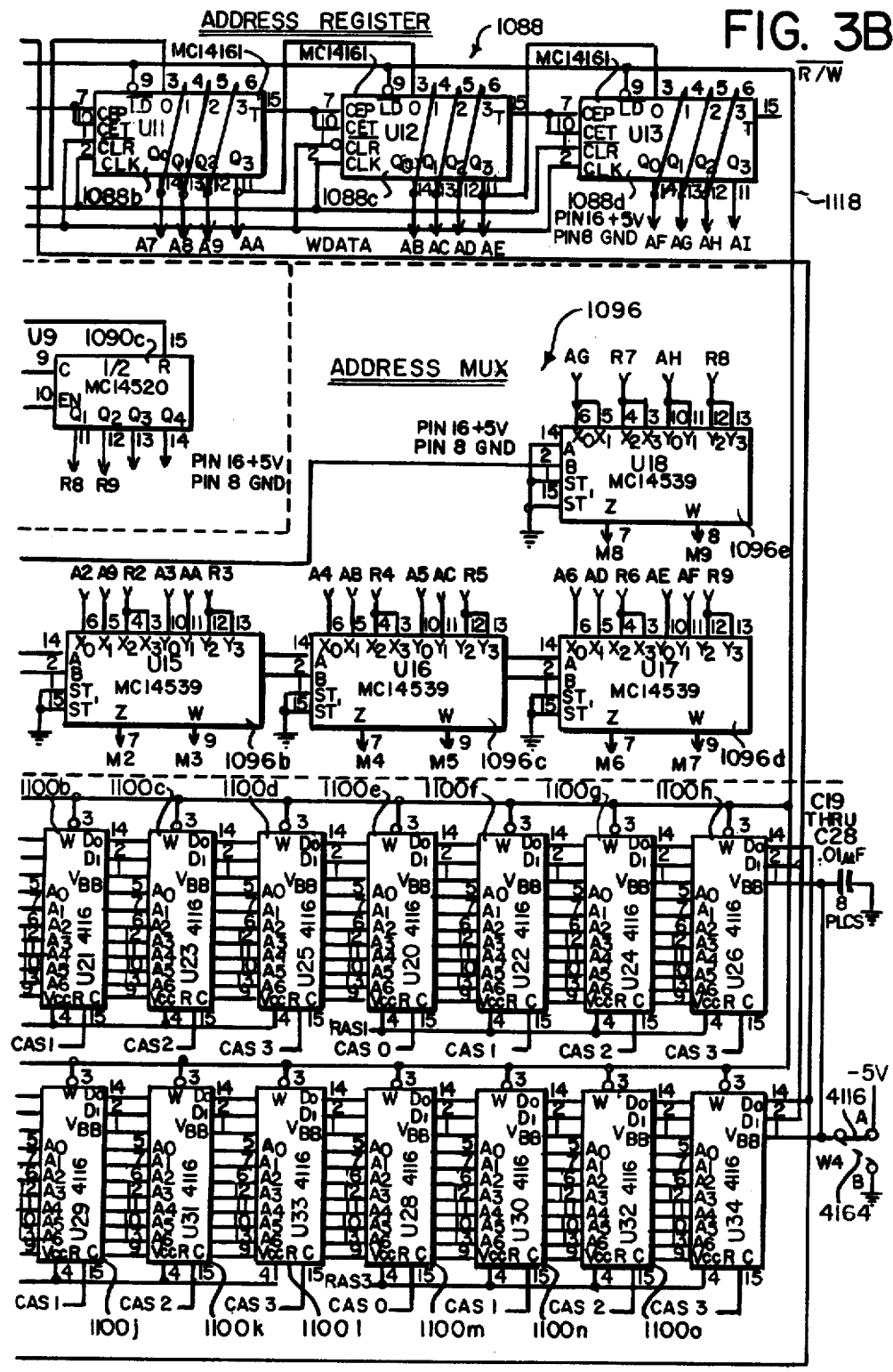

Referring now to FIGS. 3 and 4, the bulk memory 16 is shown in greater detail, with FIG. 4 being a timing diagram for use in understanding the clock signal operation of bulk memory 16. Preferably the interactive control system of the terminal 8 is designed to determine if the terminal 8 was OFF at some time since the previous OPERATE mode of the switch 22. This is preferably accomplished, by way of example, by writing data into two locations of RAM and/or bulk memory 16 to preferably be checked following a RESET. The bulk memory 16 illustrated in greater detail in FIG. 3 preferably includes several portions which facilitate the storage and retrieval of market survey data in the system 6 of the present invention. Thus, the bulk memory 16 includes a command synchronizer portion 1084, a bit counter 1086, an address register 1088, a refresh counter 1090, a divide-by-twenty-one circuit for the system clock which comprises a divide-by-three circuit 1092 and a divide-by-seven circuit 1094, an address multiplexer 1096, a chip select memory control 1098 and the memory array 1100 per se, all of which cooperate in the data storage and retrieval functions of the bulk memory 16. Command synchronizer 1084 preferably includes a pair of conventional flip-flops 1102, 1104, such as a Fairchild 4013, which are coupled together to provide the inputs to a conventional two input AND gate 1106. The D input to flip-flop 1102 is the MEMINIT memory initiate control signal provided from microprocessor 10 via QUAD latch 1048 and output path 1108. The C input to flip-flop 1102 and flip-flop 1104 is the system clock divide-by-twenty-one clock signal output from the last stage 1094d of the divide-by-seven circuit 1094 whose other stages are given reference numerals 1094a, 1094b and 1094c, respectively. The D input to flip-flop 1104 is the Q output of flip-flop 1102 which also provides one input to AND gate 1106. The other input to AND gate 1106 is the $\overline{Q}$ output of flip-flop 1104. The output of this AND gate 1106 is a program cycle control signal PCYCLE which is preferably provided in parallel to the bit counter 1086, which preferably comprises a conventional counter 1110, such as a Motorola MC14520, and to the chip select memory control 1098 via path 1112. The program cycle control signal PCYCLE, as contrasted with the refresh cycle control signal to be referred to hereinafter, is preferably synchronized with the refresh cycle control signal so that reading or writing in the memory 1100 via the READ/WRITE control signal $\overline{RW}$ occurs at a different time from the refresh cycle and insures that the program cycle is in sync with the system clock as divided-by-twenty-one. The counter 1110 of bit counter 1086 preferably receives a clock control signal from microprocessor 10 via QUAD latch 1048 and output path 1114 which clock control signal is also preferably provided to address register 1088 which provides the memory access address from the microprocessor 10 in response to the data input to bulk memory 16 from microprocessor 10 via QUAD latch 1048 and output path 1116. Address register 1088 preferably includes four stages 1088a, 1088b, 1088c and 1088d each of which preferably comprises a conventional shift register, such as a Motorola 14161, which acts as a shift register in the load mode and as a counter in the clock mode. As shown and preferred in FIG. 3, the clock control signal provided via path 1114 is provided in parallel to the clock inputs of registers 1088a–1088d which registers also receive the READ/WRITE control signal R/W from the microprocessor 10 via QUAD latch 1048 and output path 1118. As shown and preferred in FIG. 3, if the logic value of the READ/WRITE control signal R/W is a "1" it is a READ control signal to the memory 1100 whereas if it is a "0" it is a WRITE control signal to the memory 1100.

The various stages 1088a–1088d of the address register 1088 are selectively connected to the dynamic RAM 1100 address lines M0–M9 of the memory array 1100 by the address multiplexer 1096 which connects the dynamic RAM 1100 address lines M0–M9 either to the appropriate stage 1088a–1088d of the address register 1088 or to the appropriate stage 1090a–1090c of the refresh counter 1090 dependent on whether the bulk memory 16 is in the access or refresh mode, respectively, as determined by the phase of the clock control signal, which is the system clock divided-by-twenty-one. By way of example, the various address outputs from address register 1088 are respectively labeled A3, A4, A5, A6 for stage 1088a, A7, A8, A9, AA for stage 1088b, AB, AC, AD, AE for stage 1088c and AF, AG, AH, AI for stage 1088d, with the connections to the corresponding appropriate inputs to the various stages 1096a, 1096b, 1096c, 1096d and 1096e being labeled accordingly. The various stages 1096a–1096e of the address multiplexer 1096 are each preferably conventional dual four line-to-one line multiplexers, such as a Motorola MC14539. As further shown and preferred in FIG. 3, the switch control inputs to the various stages 1096a–1096e of address multiplexer 1096 are labeled A and B, which inputs are connected, respectively, to the Q output of stage 1094d and to the $\overline{Q}$ output of stage 1094b for receiving the system clock divided-by-twenty-one clock control signal whose phase determines the mode of multiplexer 1096. Thus, by way of example, if the logic signals to inputs A and B of multiplexer 1096 are both equal to logic "0" then the memory access address register outputs A0, A1, A2, A3, A4, A5, A6, AE, AG and AH are preferably switched so as to be connected to the memory 1100 address line inputs M0–M9, thereby providing the lower half of the address register 1088 to memory 1100. On the other hand, if the logic input to input A is logic "1" while the logic input to input B is logic "0", then the memory address register outputs A7, A8, A9, AA, AB, AC, AD, AF, AG, AH are preferably switched so as to be connected to the memory 1100 inputs M0–M9, thereby providing the higher half of the address register 1088 to memory 1100. However, if the logic signals to inputs A and B of multiplexer 1096 are both equal to logic "1", or if the logic input to input A is logic "0" while the logic input to input B is logic "1", then the memory 1100 will preferably be in the refresh mode with the dynamic RAM 1100 address lines M0–M9 being switched or connected to the appropriate outputs R0, R1, R2, R3, R4, R5, R6, R7, R8, R9, respectively, of the various stages 1090a–1090c of the refresh counter 1090.

It should be noted that since the memory array 1100 is preferably a dynamic RAM it preferably requires the periodic refresh provided by the refresh counter 1090 which refreshes the various stages 1100a–1100p of the dynamic RAM memory array 1100 at the system clock divided-by-twenty-one rate. Each of the sixteen dynamic RAM stages 1100a–1100p which comprises the memory array 1100 of bulk memory 16 are preferably conventional dynamic RAMs such as an Intel 4116 which are 16K×1 memory chips or Intel 4164 which are 65K×1 memory chips with a configuration employing Intel 4116 RAMs being illustrated in FIG. 3. The three stages 1090a, 1090b, 1090c of the refresh counter 1090 are preferably conventional binary counters, such as a Motorola MC14520, tied together with the enable input EN to counter 1090a being the system clock divided-by-twenty-one clock control signal $\overline{Q}$ output of stage 1094b which is connected in parallel to the B signal input to address multiplexer 1096 and to the chip select memory control 1098. As shown and preferred in FIG. 3, by way of example, the outputs of counter 1909a are labeled R0, R1, R2, R3, respectively, with output R3 being connected to the enable input EN of counter 1090b, the outputs of counter 1090b are labeled R4, R5, R6, R7, respectively, with output R7 being connected to the enable input EN of counter 1090c, and the used outputs of counter 1090c are labeled R8 and R9, respectively. The connections to the corresponding appropriate inputs to the various stages 1096a–1096e of the address multiplexer 1096 are labeled accordingly.

The actual row and column select in the dynamic RAM memory array 1100 is preferably accomplished by the chip select memory control 1098, with the row select control signals RAS0, RAS1, RAS2, RAS3 preferably being provided to the dynamic RAM memory array 1100 from a conventional one-to-four line multiplexer 1120, such as a 74LS139, and with the column select control signals CAS0, CAS1, CAS2, CAS3 preferably being provided to the dynamic RAM memory array 1100 from another conventional one-to-four line multiplexer 1122, such as a 74LS139. The connections to the corresponding row and column select inputs of the various dynamics RAMs 1100a-1100p comprising the dynamic RAM memory array 1100 are labeled accordingly. The enable inputs EN to multiplexers 1120 and 1122 are preferably provided from conventional AND/OR INVERT gate configurations 1124 and 1126, respectively, each comprising gates 1124a, 1124b and 1124c and 1126a, 1126b and 1126c, respectively. As shown and preferred in FIG. 3, the inputs to gate 1124a are the system clock divided-by-twenty-one Q output of stage 1094a and the $\overline{Q}$ output of stage 1094b while the inputs to gate 1124b are the system clock divided-by-twenty-one Q output of stage 1094d and the program cycle PCYCLE output of gate 1106 provided via path 1112, with the output of gate 1124c preferably being the enable input to multiplexer 1120 labeled $\overline{TRAS}$. The other inputs to multiplexer 1120 are the address lines M8 and M9 from address multiplexer stage 1096e. Similarly, the inputs to gate 1126a are the system clock divided-by-twenty-one Q output of stage 1094d and the $\overline{Q}$ output of stage 1094b and the program cycle PCYCLE output of gate 1106 provided via path 1112, while the inputs to gate 1126b are tied to ground, with the 25 output of gate 1126c being the enable signal input to multiplexer 1122 labeled $\overline{TCAS}$ which is also connected in parallel as the C input to a conventional flip-flop 1128, such as Fairchild 4013, which provides the data output from bulk memory 16 to microprocessor 10 via path 1042. The other inputs to multiplexer 1122 are the address register outputs AE and AF, assuming Intel 4116 RAMs are employed in the memory array 1100. In this regard, the connections in the memory array 1100 and the chip select memory control 1098 which are employed if Intel 4116 RAMs are employed are shown by solid lines labeled 4116, whereas the changes in these connections if Intel 4164 RAMs are employed in memory array 1100 are represented by dotted lines labeled 4164 in FIG. 3.

Referring now to FIG. 4 in addition to FIG. 3, the creation of the system clock divided-by-twenty-one clock control signal for bulk memory 16 shall be described. As was previously mentioned, this system clock divided-by-twenty-one clock control signal is produced from the interaction of the divide-by-three circuit 1092 and the divide-by-seven circuit 1094. The divide-by-three circuit 1092 preferably comprises a pair of conventional J-K flip-flops 1092a and 1092b, such as a 74LS109, tied together so as to conventionally provide a system clock divided-by-three output via path 1140 from the $\overline{Q}$ output of flip-flop 1092b, with the system clock, such as the preferred 6MHz clock, signal output via path 1037 from the system oscillator 40, being provided to the C input to flip-flop 1092a. A typical system clock signal input is graphically illustrated in FIG. 4. The divide-by-seven circuit 1094, as was previously mentioned, comprises four stages 1094a-1094d, each of which is preferably a conventional J-K flip-flop, such as a 74LS109, with the four stages 1094a-1094d preferably being connected so as to provide four different phase clock control signal outputs. As shown and preferred in FIG. 4, the Q outputs of stages 1094a and 1094d and the $\overline{Q}$ outputs of stages 1094b and 1094c are each the system clock divided-by-twenty-one, but of different phase. FIG. 4 also graphically illustrates the timing relationship for the refresh cycle, the program cycle when the lower half of the address register 1088 is provided to the memory 1100 and the program cycle when the higher half of the address register 1088 is provided to the memory 1100. In FIG. 4, the various timing relationships are graphically illustrated between a typical period $t_0$ to $t_1$.

Referring now to FIGS. 8-12, the preferred display portion 32 of the system 6 of the present invention which provides both prompt messages and visual verification of data entry shall be described in greater detail. As shown and preferred in FIG. 8, the display 32 comprises a multidigit display unit such as a twelve digit alphanumeric L.E.D. or light emitting diode display unit 58, which is strobed by the microprocessor 10 while displaying data. The display unit 58 is conventionally driven by a conventional display digit driver circuit 54 and a conventional display segment driver circuit 52. The display digits each preferably comprise sixteen illuminable segments which may be selected to provide the desired alphanumeric character in a seven segment character format. Accordingly, a conventional sixteen bit segment register 50 is connected between the display segment driver circuit 50 and the control signal inputs $\overline{SEGBIT}$ and SEGCLK provided via paths 1142 and 1144, respectively, from the microprocessor 10. Similarly, a conventional twelve bit digit register 60 is connected between the display digit driver circuit 60 and the control signal inputs $\overline{SEGBIT}$ and DIGSHF provided via paths 1142 and 1030, respectively, from the microprocessor 10, with the DIGSHF control signal being provided from microprocessor 10 via output multiplexer 1022. As further shown and preferred in FIG. 8, the display 32 also includes a power supply 56.

Figure 11:
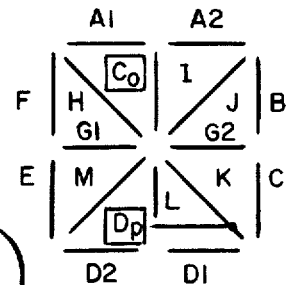

FIGS. 11 and 12 represent a typical preferred system segment display including a decimal point DP which comes on instead of the unused K segment. For purposes of explanation the various segments are labeled A1, A2, B, C, D1, D2, E, F, G1, G2, H, I, J, DP, L and M in FIGS. 11 and 12. FIG. 12 diagrammatically functionally represents the sixteen bit segment register 50 with the corresponding bits and segments which are conventionally selected to provide the desired alphanumeric display character in the preferred seven segment character format by selectively illuminating various combinations of the sixteen segments comprising the display digit or character in each of the twelve digits of the L.E.D. display unit 58.

Figure 8:
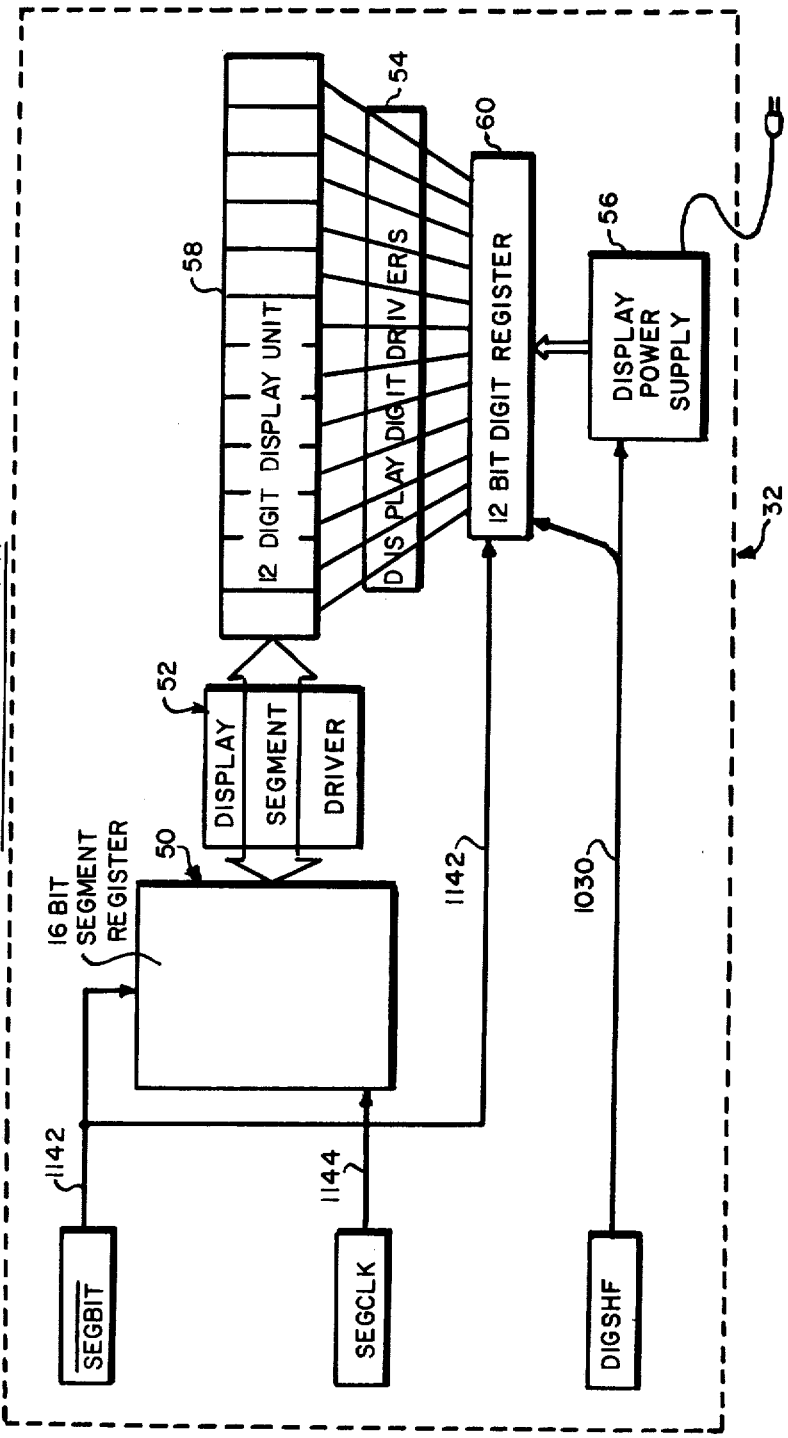
FIG. 8 is a functional block diagram of the display portion of the system of FIG. 1.
Figure 9:
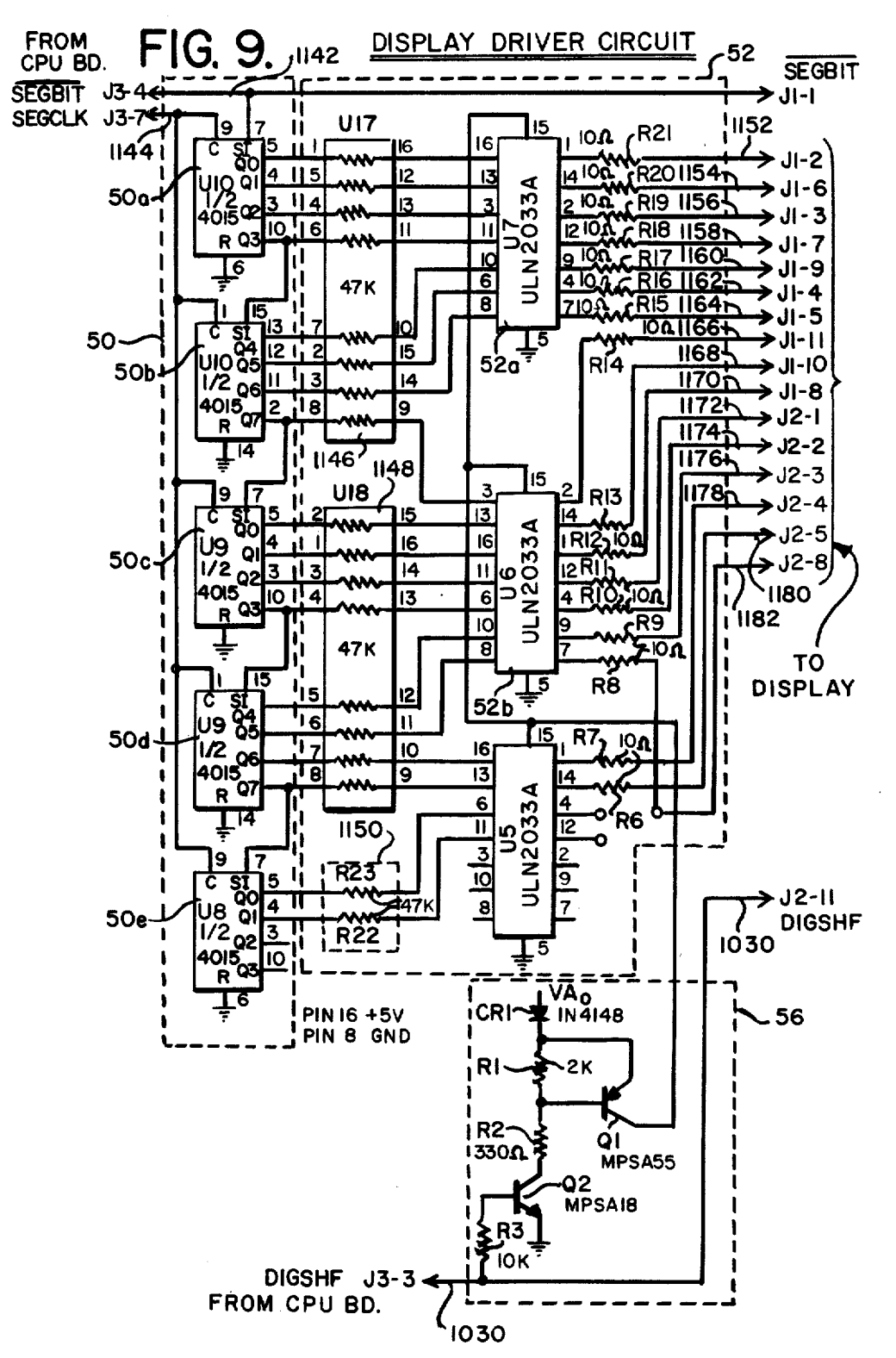
Figure 10:
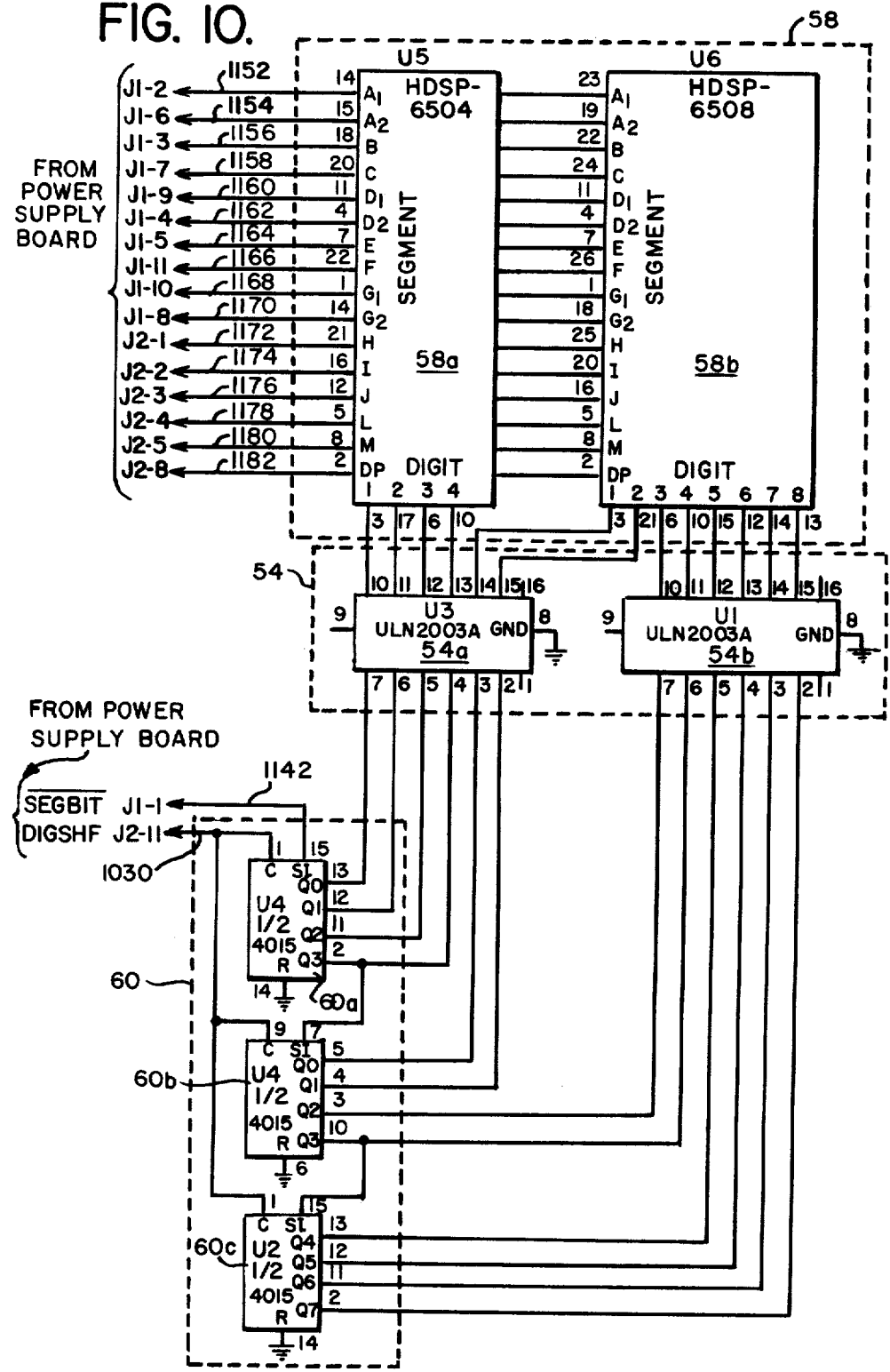

FIGS. 9 and 10 comprise a detailed schematic diagram of the various portions 50, 52, 54, 56, 58, 60 of the display 32 of FIG. 8 and will be readily understood by one of ordinary skill in the art, such as the display power supply 56 shown in greater detail in FIG. 9. Thus, the sixteen bit segment register 50 preferably comprises five conventional shift registers 50a-50e, such as a Fairchild 4015, with the SEGCLK control signal provided via path 1144 being connected in parallel to the C input of registers 50a-50e and with the $\overline{SEGBIT}$ control signal provided via path 1142 being connected in parallel to the SI input of shift register 50a. As shown and preferred in FIG. 9, the last stage of each register 50a, 50b, 50c and 50d is, in turn, connected in parallel to the SI input of the next register 50b, 50c, 50d and 50e, respectively. The display segment driver circuit 52 preferably includes conventional pull-up resistor networks 1146, 1148 and 1150 as well as conventional display segment drivers 52a, 52b and 52c, such as a Sprague ULN2033A. The various interconnections of the shift registers 50a-50e to the display segment drivers 52a-52c through pull-up resistor networks 1146, 1148 and 1150 are readily apparent from FIG. 9 and will not be described in greater detail as is the interconnection of the display power supply 56 and the display segment drivers 52a–52c. Suffice it to say that the various segment control signal output paths for the display segments A1, A2, B, C, D1, D2, E, F, G1, G2, H, I, J, DP, L and M have been given reference numerals 1152, 1154, 1156, 1158, 1160, 1162, 1164, 1166, 1168, 1170, 1172, 1174, 1176, 1178, 1180 and 1182, respectively, in FIGS. 9 and 10.

Referring now to FIG. 10, the twelve digit L.E.D. display unit 58 preferably comprises display control units 58a and 58b, such as conventional Hewlett-Packard HDSP 6504 and HDSP 6508 display control units, respectively, with display control unit 58a preferably relating to four of the twelve digits comprising the twelve digit alphanumeric L.E.D. display unit 58 and with display control unit 58b relating to the other eight digits of the twelve digit display 58. As further shown and preferred in FIG. 10, the display digit driver circuit 54 comprises a pair of conventional display digit drivers 54a and 54b, such as a Sprague ULN2003A, appropriately interconnected to display control units 58a and 58b as shown in FIG. 10. The conventional twelve bit digit register 60, as shown and preferred in FIG. 10, comprises three conventional shift registers 60a–60c, such as Fairchild 4015, which are appropriately interconnected in the manner illustrated in FIG. 10 to the display digit drivers 54a and 54b. In this regard, the DIGSHF control signal input provided via path 1030 is preferably connected in parallel to the C input of shift registers 60a–60c while the SEGBIT control signal input provided via path 1142 is preferably connected to the SI input of shift register 60a whose last stage is, in turn, connected in parallel to the SI input of shift register 60b whose last stage is, in turn, connected in parallel to the SI input of shift register 60c. The various interconnections of the shift registers 60a–60c with the display digit drivers 54a and 54b are readily apparent from FIG. 10 and will not be described in greater detail hereinafter as they will be readily understood by one of ordinary skill in the art.

The interactive market survey control functions of the system 6 of the present invention are illustrated in the logic flow diagram of FIGS. 19–45, which particularly illustrate the nature of the display 32 in providing prompt messages to the user and verification or confirmation of data input. The various possible states of the sixteen segment alphanumeric display 32 are summarized in FIG. 44, with the symbol "d" being representative of a typical display digit input by the user which is verified by its appearance in the display 32. As was previously mentioned, although the display 32 employs a sixteen bit segment register 50, it is preferably used to display all of the desired numeric and alphabetic characters in a seven segment character format. The overall operation of the system 6 will subsequently be described in greater detail with further reference to FIGS. 19–45. However, suffice it to say at this point that the display 32 plays an integral part in monitoring and supervising the proper storage of the market survey data being collected so as to minimize erroneous data entry and thereby insure the accuracy of market survey data collected from a shoppers' panel of unsophisticated users. Thus, if the electronic data collected were less accurate than that collectible by prior art manual methods, it could not be employed and would not prove beneficial even though it were inherently faster. In other words, accuracy cannot be sacrificed for speed in market survey data collection or any other type of statistical data collection if the information based thereon is to be at all meaningful. In this regard, the system 6 will not accept obviously erroneous data, such as providing information as to STORE when the DAY of purchase is requested, or requiring a confirmation signal where potential confusion can occur, with the annunciator 34 providing a buzzer 1184 (FIG. 7) indication, under control of microprocessor 10 as a result of an output control signal provided via path 1024 such as when an erroneous data entry has been made by the user or when a confirm (*) command has been input to the system 6, as will be described in greater detail hereinafter.

By way of example, the display 32 interface with the microcomputer 10 of the system 6 can be defined in terms of the following table which interrelates the BUZZER control signal provided via path 1142, the SEGCLK control signal provided via path 1144 and the DIGSHF control signal provided via path 1030 as they relate to control of the alphanumeric display 32 presentation:

| DISPLAY INTERFACE TABLE | | |
|---|---|---|
| signal line | sense | use |
| BUZZER (annunciator) | 0=silent<br>1=sound | keep 1 for at least 100ms. to make audible noise. |
| $\overline{\text{SEGBIT}}$ | 1=off, 0=on | Data bit for segment register if you clock SEGCLK |
| | -or-<br>0=off, 1=on | -or-<br>"seed" bit for digit position register if you clock DIGSHF |
| SEGCLK | 0=normal<br>0 to 1 | Bring high (1) then low (0) to set the first bit equal |
| | transition=<br>"clock!" | to $\overline{\text{SEGBIT}}$, shift all the bits down one position, and drop the last bit out into the bit bucket. |
| DIGSHF | 1=on/normal<br>0=off | Bring low to kill display power while you manipulate segments. Bring high to set the first bit equal to |
| | 0 to 1<br>transition=<br>"clock!" | $\overline{\text{SEGBIT}}$, shift all the bits down one, drop the last bit off into the bit bucket, and bring up the display power. |

As was previously mentioned with reference to FIGS. 1 and 13, a barboard 29, such as twelve character barboard containing UPC version A number system 1 labels identical in value to a number and symbol Touch-Tone keyboard array, may preferably be employed in conjunction with the wand 28 to input all data to the system 6. Alternatively, as was also previously mentioned, barboard 29 may be replaced by a conventional keyboard 69, such as a Grayhill P/N 84AC1-102 keypad, in which instance the keyboard 69 may be employed to input supplementary market survey data in response to the prompt messages provided via the display 32 as well as to input market survey data not readable by the wand 28. Such a terminal 8 is illustrated in FIG. 14. A typical preferred keyboard circuit 70 for use in the terminal 8 of FIG. 14 is illustrated in FIG. 15.

Figure 14:
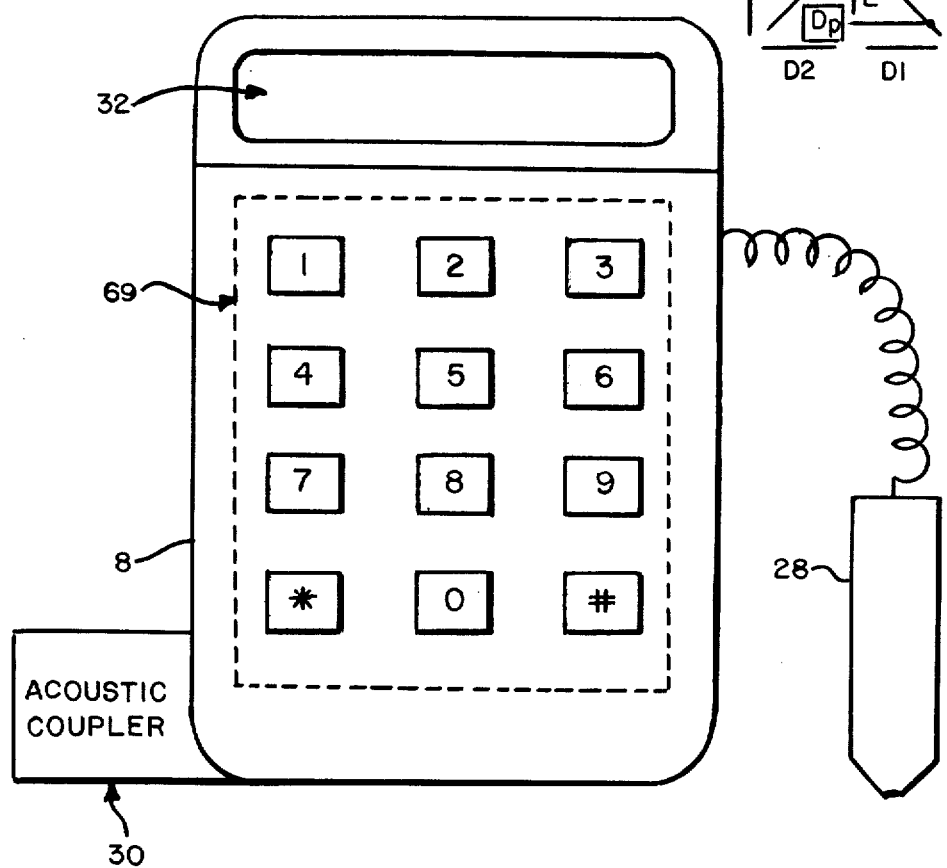
FIG. 14 is a plan view similar to FIG. 1 of an alternative preferred embodiment of the terminal of the system of FIG. 1.
Figure 15A:
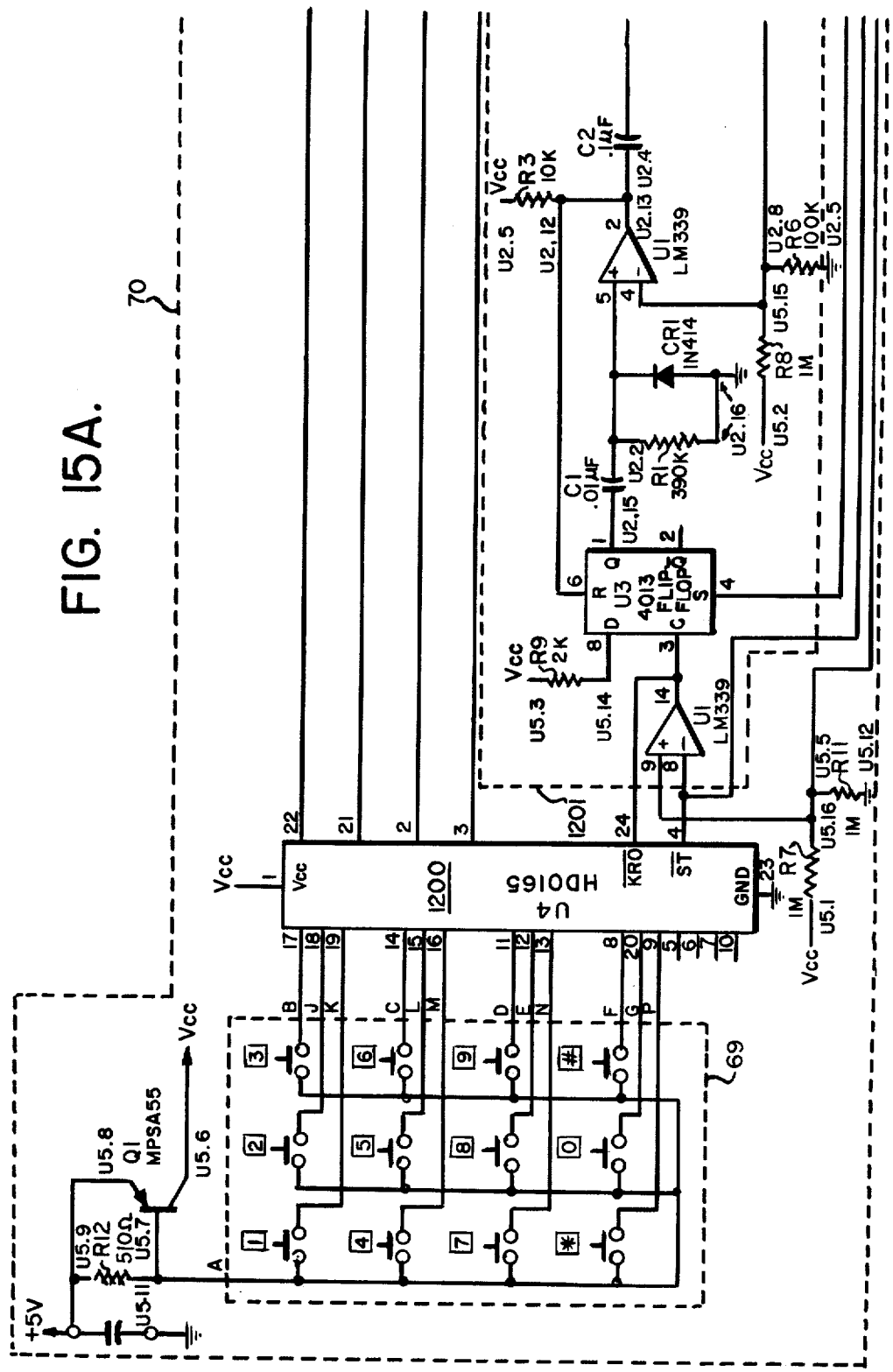

Referring now to FIGS. 14 and 15, a typical type of conventional keypad 69, such as the aforementioned Grayhill keypad, is illustrated in FIG. 15 as being operatively connected to the microprocessor 10, via paths 1190, 1192, 1194 and 1196, illustrated by dotted lines since the keyboard circuit 70 is employed in place of the presently preferred barboard 29, through a conventional keyboard interface 1200, such as a Harris Semiconductor HD0165, and a plurality of dual input NAND gates 1202, 1204, 1206 and 1208, such as a Fairchild 40111, which are strobed by a conventional keyboard strobe circuit 1210. Since the keyboard circuit 70 per se illustrated in FIG. 15 is essentially conventional, it will not be described in any greater detail hereinafter as it will be readily understood by one of ordinary skill in the art.

As was previously mentioned, once the market survey data has been input to the system 6 and stored in the memory 16, it is preferably subsequently transmitted to a remote computer (not shown) for processing via conventional telephone lines by means of the acoustic coupler 30 provided with the terminal 8. Such an acoustic coupler 30 conventionally receives a conventional telephone handset (not shown) in a telephone handset cradle designed to hold a standard telephone handset so as to acoustically couple the transmitter portion of the telephone handset to the telephone lines via a speaker 1212 (FIG. 16) located in the acoustic coupler 30 housing in acoustic contact with the telephone handset transmitter portion. The acoustic coupler 30 is preferably connected to the microprocessor 10 TXDATA output line 1028 via connector 36 and the acoustic coupler driver 42 described with reference to FIG. 2. As shown and preferred in FIG. 16, the acoustic coupler 30 may also preferably include a light bulb indicator 1214 which visually indicates the ON or OFF mode of the acoustic coupler 30. It should be noted that, preferably, since the communications data output goes to the acoustic coupler 30, the signal TXDATA via path 1028 is preferably, by way of example, a square wave output during data bits with a frequency of 1200Hz during a "1"bit and 2200 Hz during a "0" bit, with the transmission over the telephone lines preferably being at 300 baud.

Figure 17:
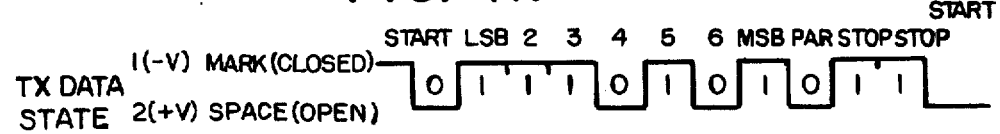
FIG. 17 is a graphic illustration of a typical TX DATA line transmission of an ASCII character W in accordance with the present invention.

The transmission of each character via the TX DATA line 1028 through the acoustic coupler 30 and telephone handset and out over the telephone lines to the remote computer is preferably accomplished on a character-by-character basis. Thus, starting at the point at which the user commences a transmission of the stored data to the remote computer, the microprocessor 10 makes the TXDATA line 1028 a "0" for a one bit time so as to provide a start bit. Thereafter, the TXDATA line 1028 is made a "0" or a "0" for each data bit and parity bit, if present, for one bit time each, in the character being transmitted from the memory 16. Of course, it should be noted that there is normally no time between bits within a character, with each bit time period starting at the end of the previous bit time period. At the completion of the transmission of the character, the microprocessor 10 preferably makes the TXDATA line 1028 a "1" for either two bit times or not less than three bit times to create stop bits before initiating the next start bit of the next character being transmitted. Preferably, the order of the data bits being transmitted is the least significant bit first and the most significant bit last, followed by the parity bit. By way of example, the least significant and most significant bits are shown, in ASCII code, in the ASCII Character Set Table of FIG. 18. A typical exemplary TXDATA line 1028 output for transmission of such an ASCII "W" character including, by way of example an odd parity, is illustrated in FIG. 17, where "LSB" represents the last significant bit, "MSB" represents the most significant bit and "PAR" represents the parity bit.

As was previously mentioned, the microprocessor 10 which controls the TXDATA line 1028 transmission is the overall system controller for the terminal 8 with respect to both data collection and storage and data transmission of market survey data. The various I/O lines on the microprocessor 10 have been previously described with reference to FIG. 2. However, for purposes of clarity, the functions of these I/O lines are summarized in the table below.

I/O LINE ASSIGNMENTS TABLE

| Bit | Name | Group |
|---|---|---|
| Port 2 | | |
| 0 | THRESH CTL | Reading Wand |
| 0 | DATA OUT | Bulk Memory |
| 1 | ADDR CLK | |
| 2 | SELECT | |
| 3 | CYC INIT | |
| 4 | UNUSED | |
| 5 | UNUSED | |
| 6 | UNUSED | |
| 7 | DATA IN | Bulk Memory |
| Port 1 | | |
| 0 | ADDRESS$_0$ | Multiplex I/O Control |
| 1 | ADDRESS$_1$ | |
| 2 | ADDRESS$_2$ | |
| 3 | OUT DATA | |
| 4 | ENABLE | |
| 5 | INPUT | |
| 6 | SEGBIT | Display Control |
| 7 | SEGCLK | |
| TO TI | OPERATE WAND DATA | STBY/OPER-Switch Reading Wand |

With respect to the above exemplary table of I/O line assignments, six I/O lines in PORT 1 of the microprocessor 10 are preferably used to operate the two multiplexers 1022 and 1040, with output multiplexer 1022 preferably controlling eight lines of output and with input multiplexer 1040 preferably controlling eight lines of input. However, the two multiplexers 1022 and 1040 share three common address lines ADDRESS 0, ADDRESS 1 and ADDRESS 2. The preferred multiplex I/O control as well as the preferred multiplex I/O assignments are summarized in the tables below with the OUT DATA and ENABLE lines preferably being used to operate the output line after the address is set up and with the address being set up to select the desired input line.

MULTIPLEX I/O CONTROL TABLE

| line | sense | use |
|---|---|---|
| ADDRESS 0 ADDRESS 1 ADDRESS 2 | Binary value 0–7 (1 is 1 and 0 is 0) | Set up the address of the input or output multiplexer line you intend to use |
| OUT DATA | 1 = 1 and 0 = 0 | Value for addressed multiplex output line to take any time ENABLE is brought low (0) |
| ENABLE | 1 = off; addressed output line keeps last value it had | Bring low, then high, to latch addressed output line to value on OUT DATA line or leave low |
| | 0 = on; addressed line | to operate addressed |

-continued

MULTIPLEX I/O CONTROL TABLE

| line | sense | use |
|---|---|---|
| INPUT | "connected" to output data line 1=1 and 0=0 | output line with the OUT DATA line This line is always "connected" to the currently addressed input line This line is not affected by the ENABLE line |

MULTIPLEX I/O ASSIGNMENTS TABLE

| address | input line | group | output line | group |
|---|---|---|---|---|
| 0 | BATTLO | Power Status | ROM SELECT | External Memory |
| 1 | BATT REPL | | RAM SELECT | |
| 2 | RX DATA | Comm. | BUZZER | Feedback |
| 3 | (UNUSED) | | POWER DOWN | CPU 10 Pwr |
| 4 | (UNUSED) | | TX DATA | Comm. |
| 5 | PWR DELAY | Start up | RTS | |
| 6 | CONFIG 0 | BULK MEMORY 16 | DIGSHF | Display 32 |
| 7 | CONFIG 1 | CAPACITY | (UNUSED) | |

For purposes of completeness, an exemplary interactive control program through which the microprocessor 10 supervises and controls the overall operation of the system 6 of the present invention is provided below in the annexed program listing, assuming that the microprocessor configuration 10 is as illustrated in FIGS. 1 and 2 for an Intel 8748, 8039 or 8035, with the program being written in Intel Assembler language and stored in the program memory associated with the microprocessor 10.

The program listing, submitted as an annexation to the specification, has been submitted so as to be part of the file but is not to be printed.

OPERATION

Figure 19:
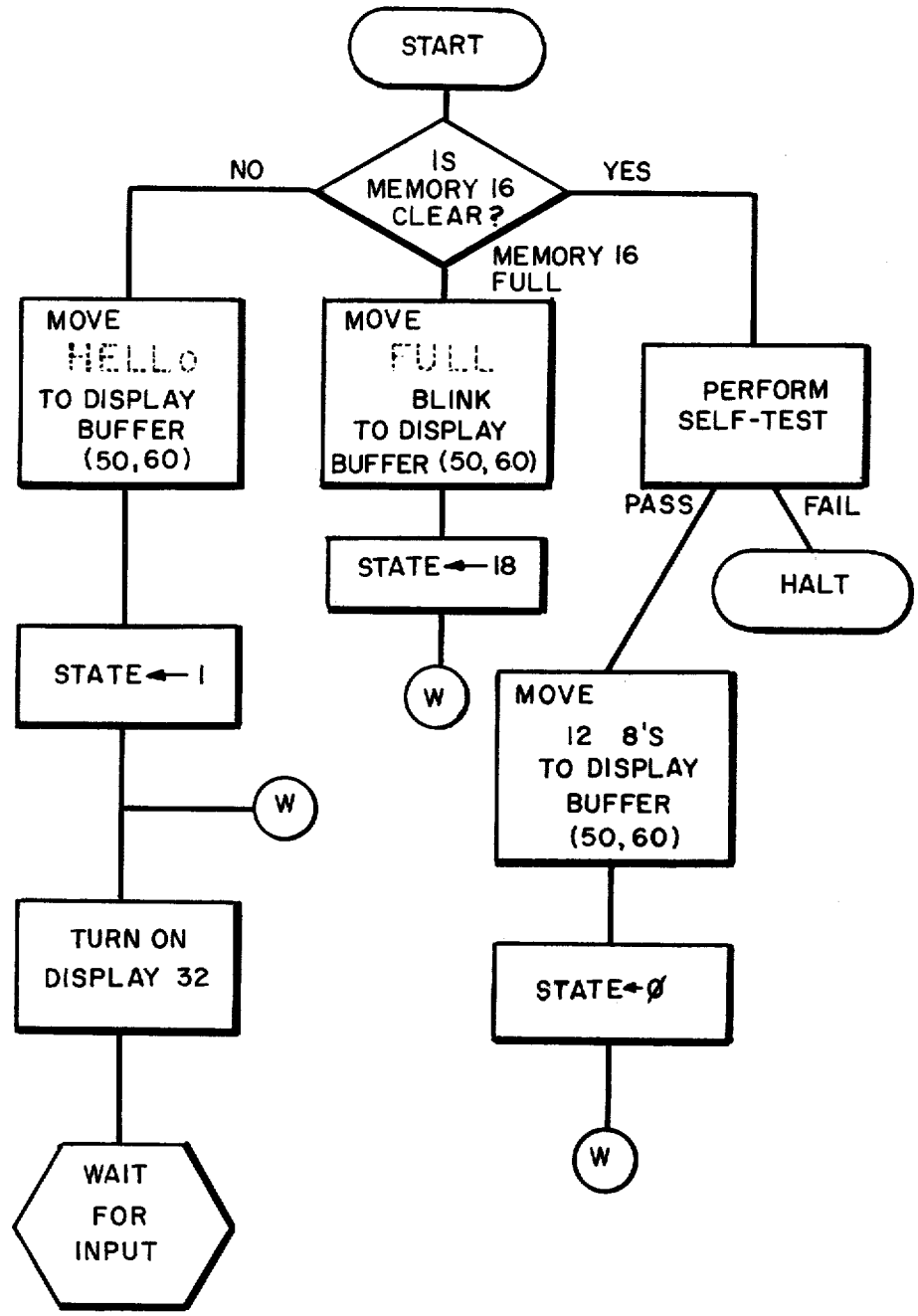

Now that the structural details of the preferred system 6 of the present invention have been described, the functional and user interface aspects of the market survey data collection terminal 8 of the present invention shall be described with reference to FIGS. 19-45 which represent a flowchart of the functional operation of the terminal 8. Preferably, there are two levels of turn-on for the terminal 8; i.e., initial turn-on when there is no market survey data stored in the terminal 8, and all subsequent transitions of all the OPERATE/STANDBY switch 22 from the STANDBY mode to the OPERATE mode. When the terminal 8 is plugged into the wall power outlet, turning mode switch 22 to the OPERATE mode causes a self-test if there is no data stored in memory 16. Such a test mode sequence is illustrated in FIG. 19. During this test mode sequence, an automatic test of internal circuitry is performed which, if successful, results in the display of all segments, which would cause the display of twelve 8's on the twelve digit L.E.D. display 32. If the test is unsuccessful, nothing would be displayed. Moreover, if only partial segments are displayed this would be indicative that portions of the display 32 were inoperable. After the display 32 of all 8's is observed, the user would then enter a CONFIRM command, represented by the symbol *, which would cause the display of the word HELLO on the display 32. Similarly, when the terminal 8 is turned on after a previous market survey data collection and storage sequence, the test sequence is omitted and the display 32 displays the word HELLO.

Figures 44, 45:
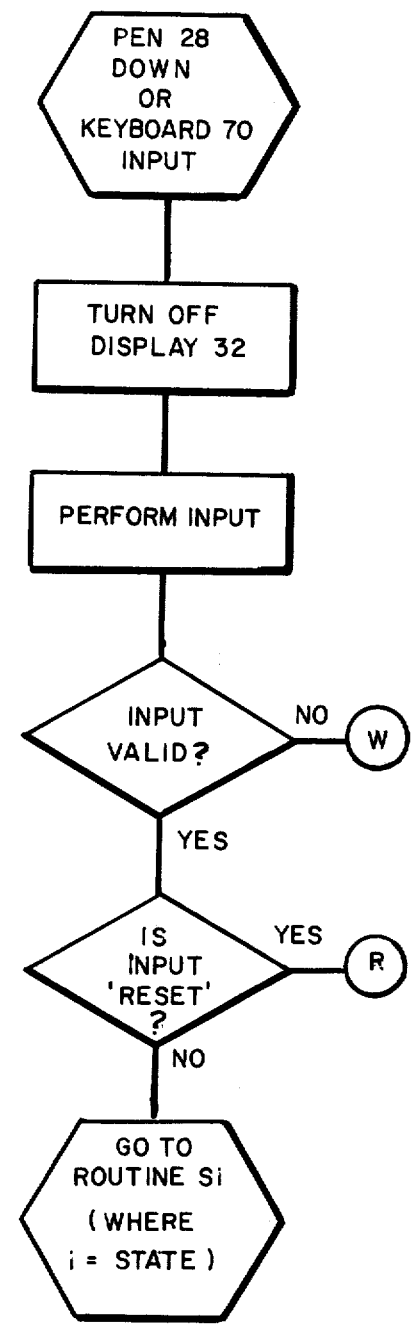

After turn-on of the terminal 8 and completion of the test sequence, if applicable, the terminal 8 is ready for a market survey data collection sequence. Such a market survey data collection sequence preferably consists of a sequence of commands and data entries in response to prompt messages appearing on the display 32. Each entry preferably takes place in a unique machine mode or state with the machine state for current data entry being selected as illustrated in FIG. 45 after an entry signal which is produced when entering data or commands. As was previously mentioned, a summary of all machine state displays S$\phi$ through S21 provided in accordance with the present invention is illustrated in FIG. 44.

As was also previously mentioned, data entry of product data is accomplished by the bar code wand 28 scanning of UPC labels while data entry of panelist or user identification, DEMONSTRATION MODE SELECT, TRANSMIT ENABLE and MEMORY ERASE ENABLE is also preferably accomplished by bar code wand 28 scanning of the unique UPC number system 1 labels imprinted on a separately provided panelist or user ID card (or manual digit-by-digit entry thereof). The entry of supplementary market survey data, such as day, store, quantity, price, special and cents off, or of the command signals confirm * or reset # is preferably accomplished by bar code wand 28 scanning of the barboard 29 array of UPC number system 1 bar code labels arrayed as a Touch-Tone keyboard on a permanently imprinted faceplate in the embodiment of FIG. 13, or by keying the appropriate numerical or command data from the conventional 12 key Touch-Tone telephone keyboard 69 in the embodiment of FIG. 14. Preferably, none of the labels or codes on the panelist or user ID card or the barboard 29 are valid UPC product labels so that there can be no confusion by the system 6 between these labels or codes and the actual UPC product identifiers.

Figure 20:
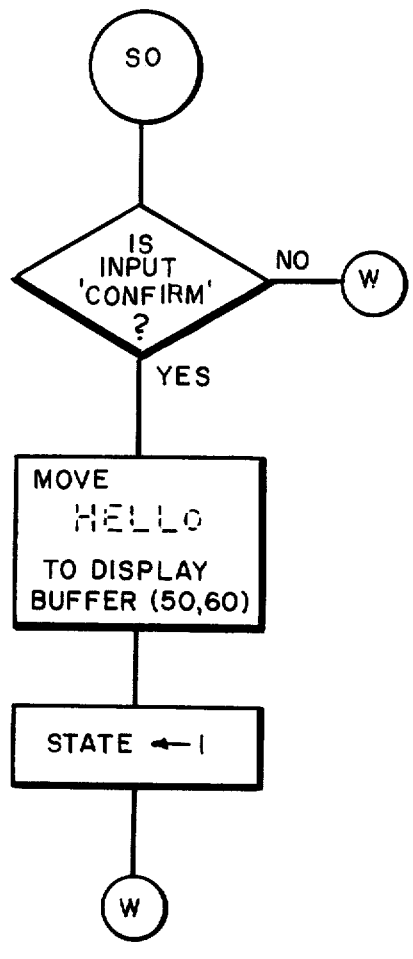

With respect to identification to the system 6 of the user or panelist inputting the market survey data, this is preferably accomplished following confirmation of all 8's (state S$\phi$ in FIG. 20). Thus, as shown and preferred in FIGS. 21 and 22, the next step (steps S1 and S2) involved is to scan the panelist identification number on the panelist identification card with wand 28. If entered successfully, a tone will be produced by the buzzer 34 and the 7 digit ID will be stored in memory 16 followed by automatic display of the prompt messages HELLO and DAY shown in FIGS. 21 and 22. Unsuccessful wand 28 reads preferably have no effect and produce no tone by the buzzer 34.

Figure 23:
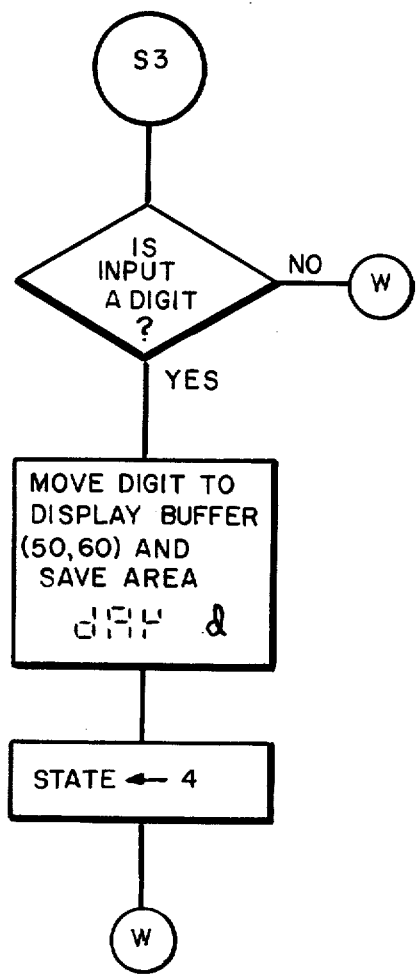
Figure 21:
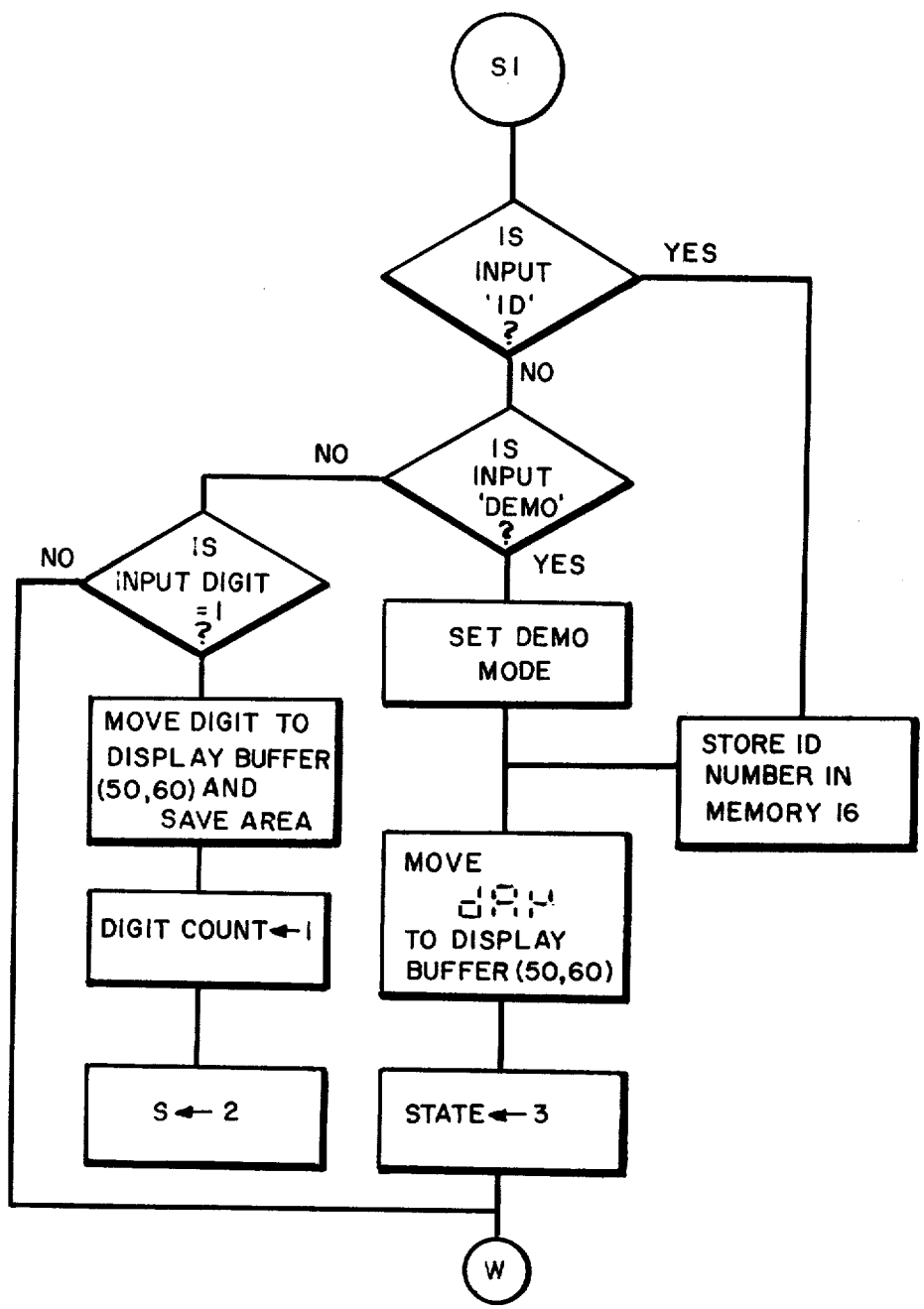
Figure 22:
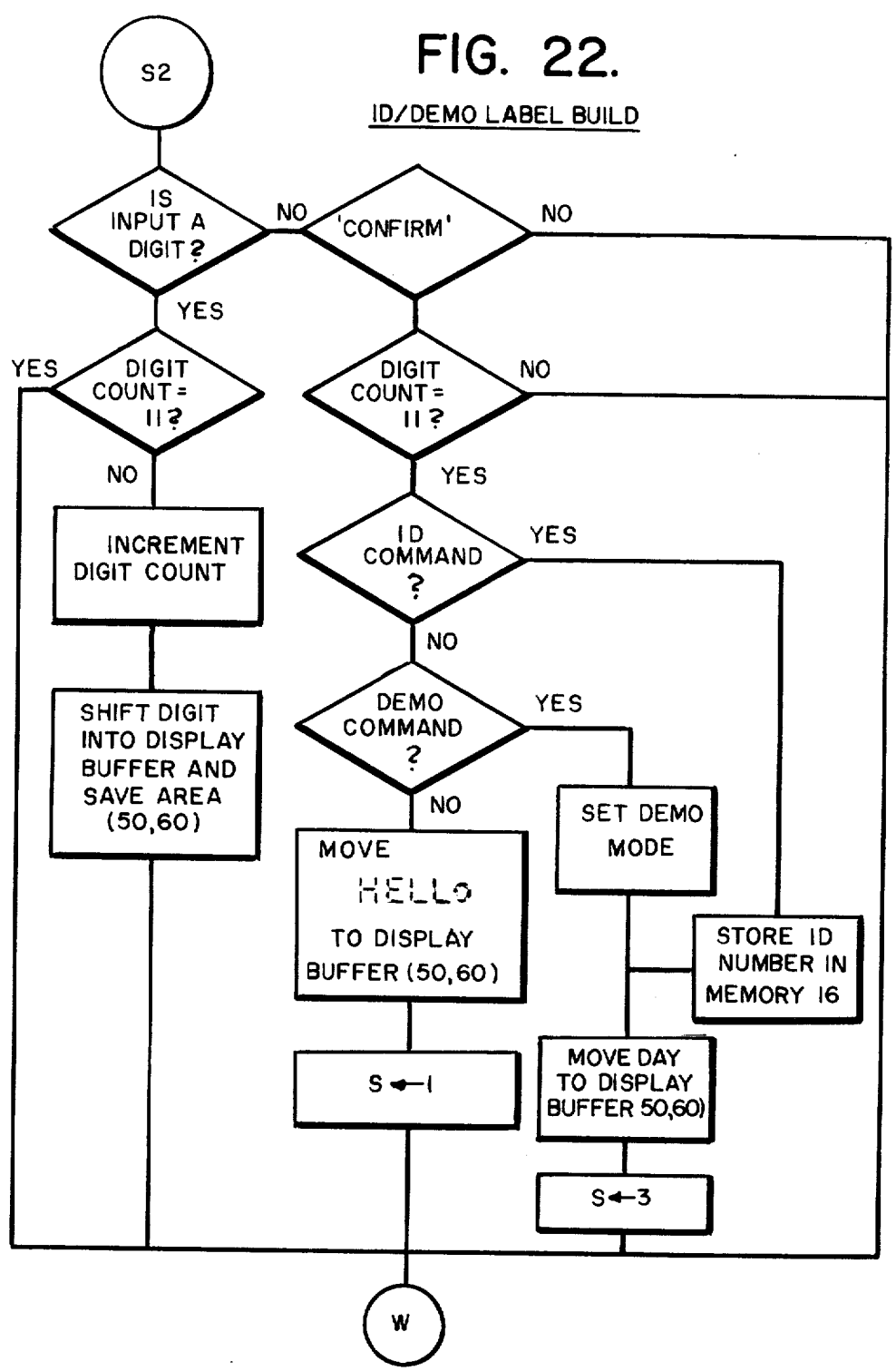
Figure 24:
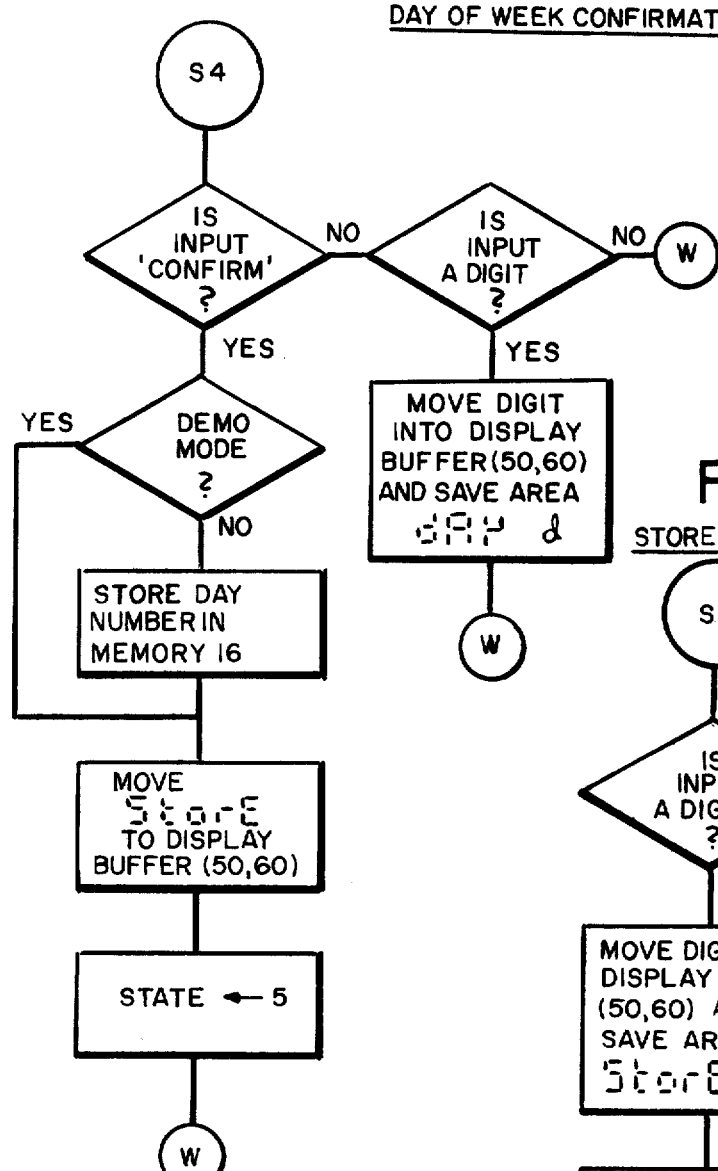
Figure 25:
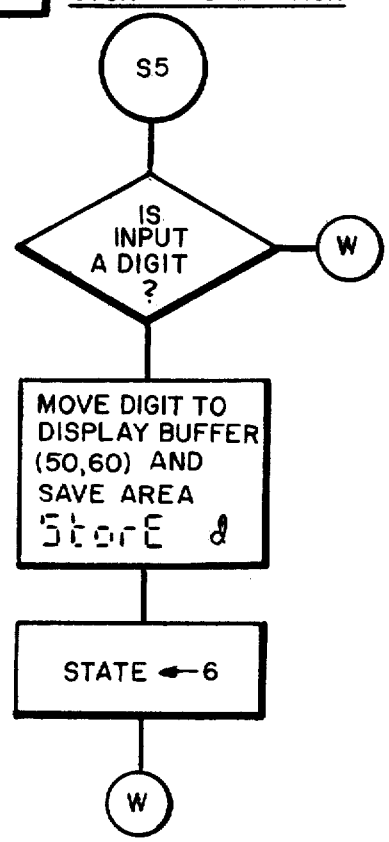

In response to the prompt message DAY on display 32, the user or panelist enters the day of the week in state S3, by number 1 through 7 as shown in FIG. 23. The panelist enters in the day of the week from the keyboard 69 or barboard 29, depending on whether the embodiment of FIG. 14 or FIG. 13 is employed. Successful entry of this data produces a tone from buzzer 34 and results in a display on display 32 of the day number 1 through 7, i.e. Sunday through Saturday respectively, being displayed adjacent to "DAY" which provides verification to the panelist of the data being entered prior to storage thereof. Assuming this data is correct, the panelist then enters a CONFIRM (*) command (state S4 in FIG. 24) which produces a tone from buzzer 34, terminates the DAY-OF-WEEK mode and initiates the STORE ID display 32 as shown in FIG. 24. If an erroneous day number had been entered by the panelist, it may be corrected by first then entering the correct day number prior to entering the CONFIRM (*) command.

Figure 26:
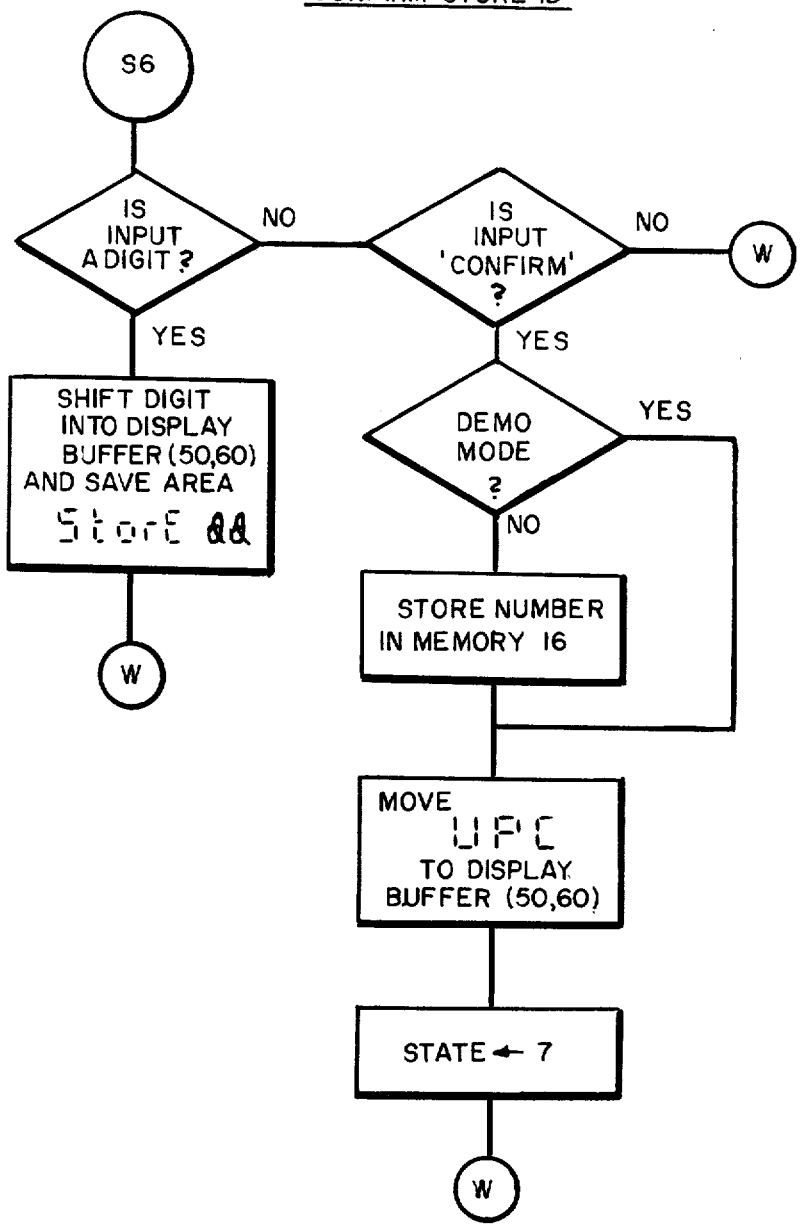

In response to the prompt message STORE on display 32 (state S5 in FIG. 25), the panelist enters the identification number of the store at which the items being surveyed were purchased. Again, the panelist enters the store number from the keyboard 69 or barboard 29 depending on the embodiment employed. Successful entry of this data results in a display on display 32 of the store number adjacent to the prompt message STORE. This provides verification to the panelist of the data being entered prior to storage thereof. Assuming this data to be correct, the panelist then enters a CONFIRM (*) command (state S6 in FIG. 26) which produces a tone from buzzer 34, termination of the STORE ID display as shown in FIG. 26 and produces the product code entry prompt message display UPC on display 32. Again, it is noted that store number entries can be continually entered to correct an error any time prior to entry of the CONFIRM (*) command. At this point, the terminal 8 is now ready for entry of market survey product data.

Figure 27:
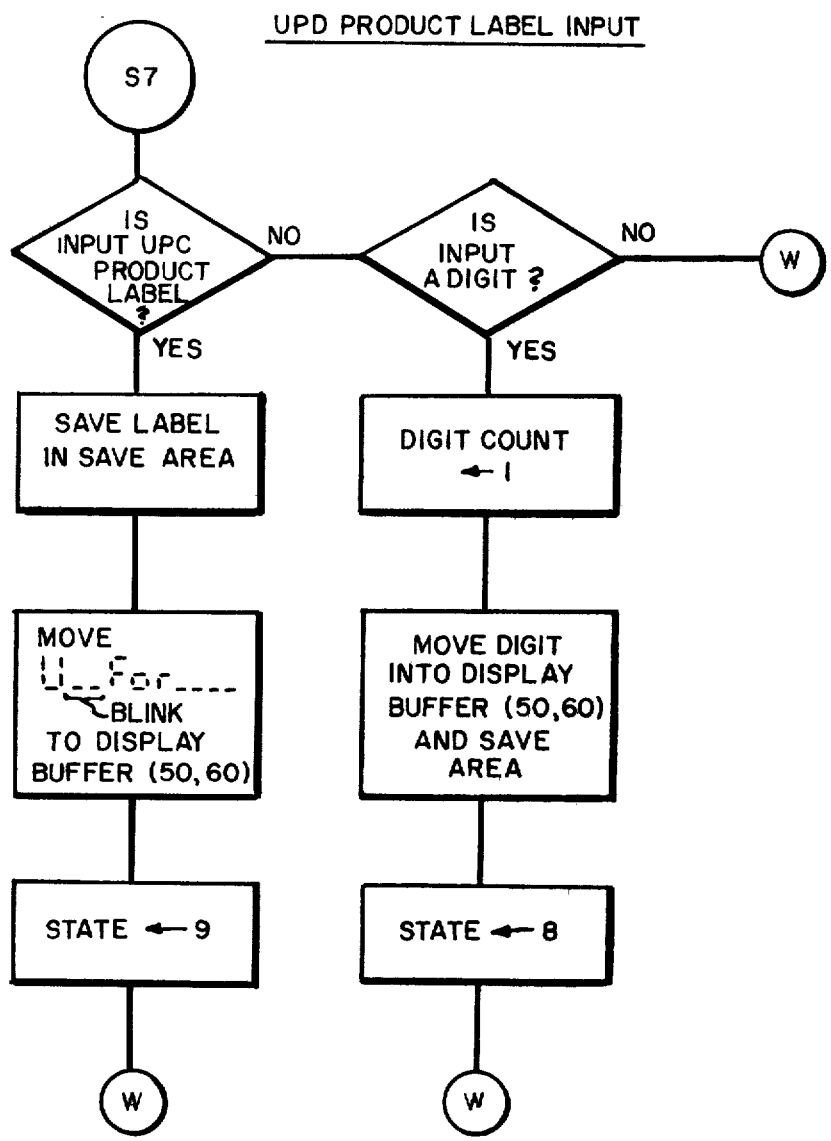

In entering such product data, the first data entered is identification of the product by its UPC code in response to the UPC prompt message display on display 32. This UPC product information is normally preferably entered into the system 6 by scanning of the UPC product label with the wand 28. Entry of a product label (state S7 in FIG. 27) results in the UPC product code being entered followed by a tone from buzzer 34 and automatic sequencing to the units/price prompt message display, "U ___ For ___ . ___ " on display 32 with the first two underscores preferably blinking to indicate or prompt the panelist as to the first field to be entered as shown in FIG. 27. If the UPC product label cannot be read for some reason with the wand 28, the human readable numeric data from the product label may be entered manually, digit-by digit, starting with the UPC number system digit in the left margin of the label and continuing left to right, digit-by-digit, until all seven (zero-suppressed) or eleven digits are entered via the keyboard 69 or barboard 29. If the UPC number system digit is omitted then only 6 or 10 digits are entered with the zero system automatically supplied, otherwise 7 or 11 digits are recognized and stored. Entry of more than eleven digits will be ignored and the display 32 will retain the first eleven entries until a CONFIRM (*) or RESET (#) command (see FIG. 28). It should be noted that entry of the check digit is impractical since it is not always human readable from the label and therefore no check on the validity of the numeric entry can be made except as to correct number of digits. An ASCII symbol is preferably inserted in place of the check digit for later recognition of manual entry of a UPC label.

Referring once again to the units/price prompt message display, in response thereto, the panelist enters the number of units, digit-by digit, most significant to least significant. The digits are then shifted into the two character field from the right as on a conventional calculator. The first digits entered replace the blinking underscores and subsequent digits entered replace the previously entered digits. Entry of the first digit is preferably accomplished in state S9, illustrated in FIG. 29, while entry of subsequent digits and confirmation is preferably accomplished in state S10, illustrated in FIG. 30. The "quantity" underscores in the units/price prompt message display will preferably blink and so will the entered data which has replaced the underscores. If the number of items or units is correct, the CONFIRM (*) command (state S10 in FIG. 30) is then entered which results in a tone from buzzer 34 and the price section of the units/price prompt message display 32 then commences blinking to prommpt the panelist that this field is to be filled. The panelist then preferably enters the price (state S11 in FIG. 31) as one to four digits left to right (dollars then cents) as shown in FIG. 31. Price underscores and price data which have replaced the blinking underscores will preferably continue to blink until the panelist enters the CONFIRM (*) command. The entry of the CONFIRM (*) command (state S12 in FIG. 32) terminates the UNIT QUANTITY/PRICE mode and preferably initiates the SPECIAL OFFER entry mode as shown in FIG. 32. It should be noted that quantity and price entries can be continually entered to correct an error without the need to reset.

Figure 33:
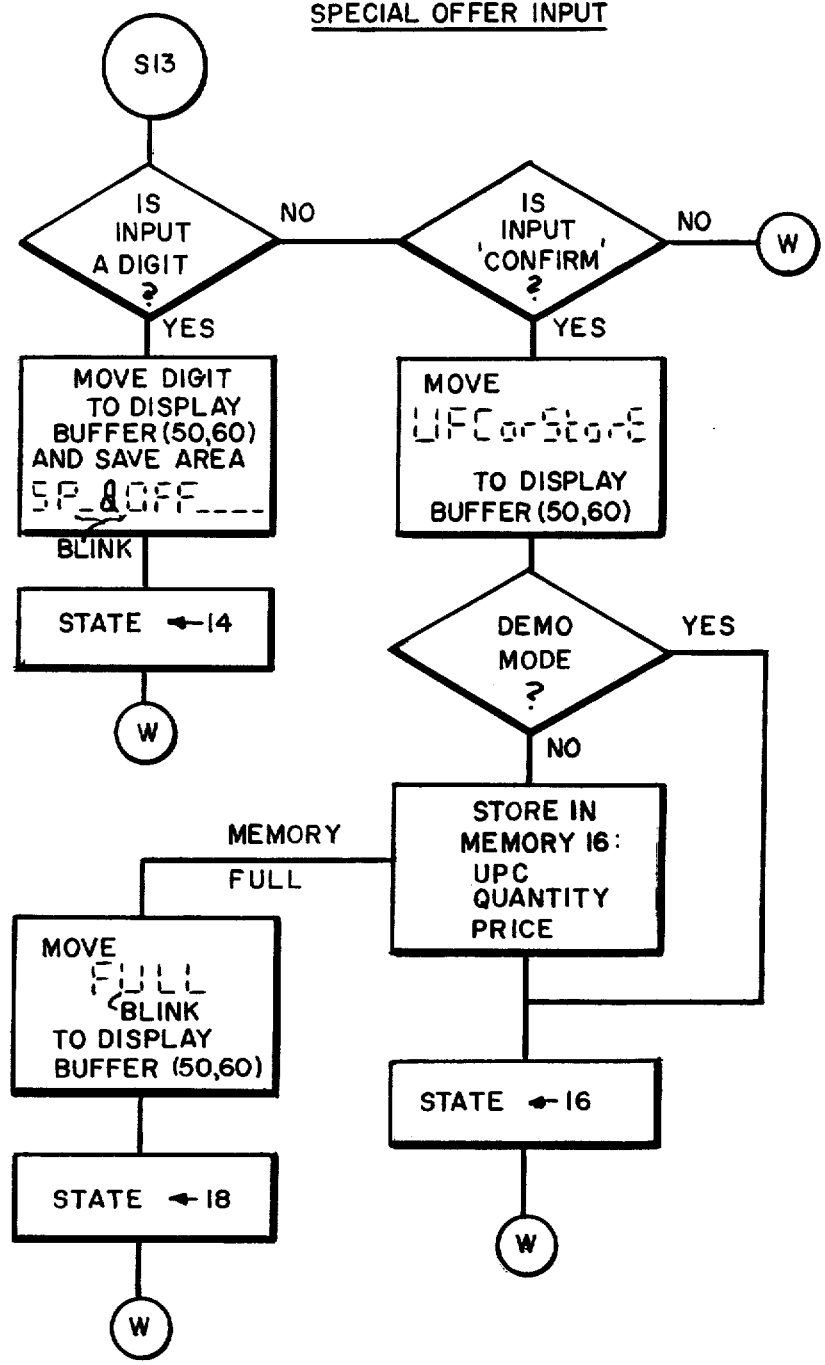
Figure 35:
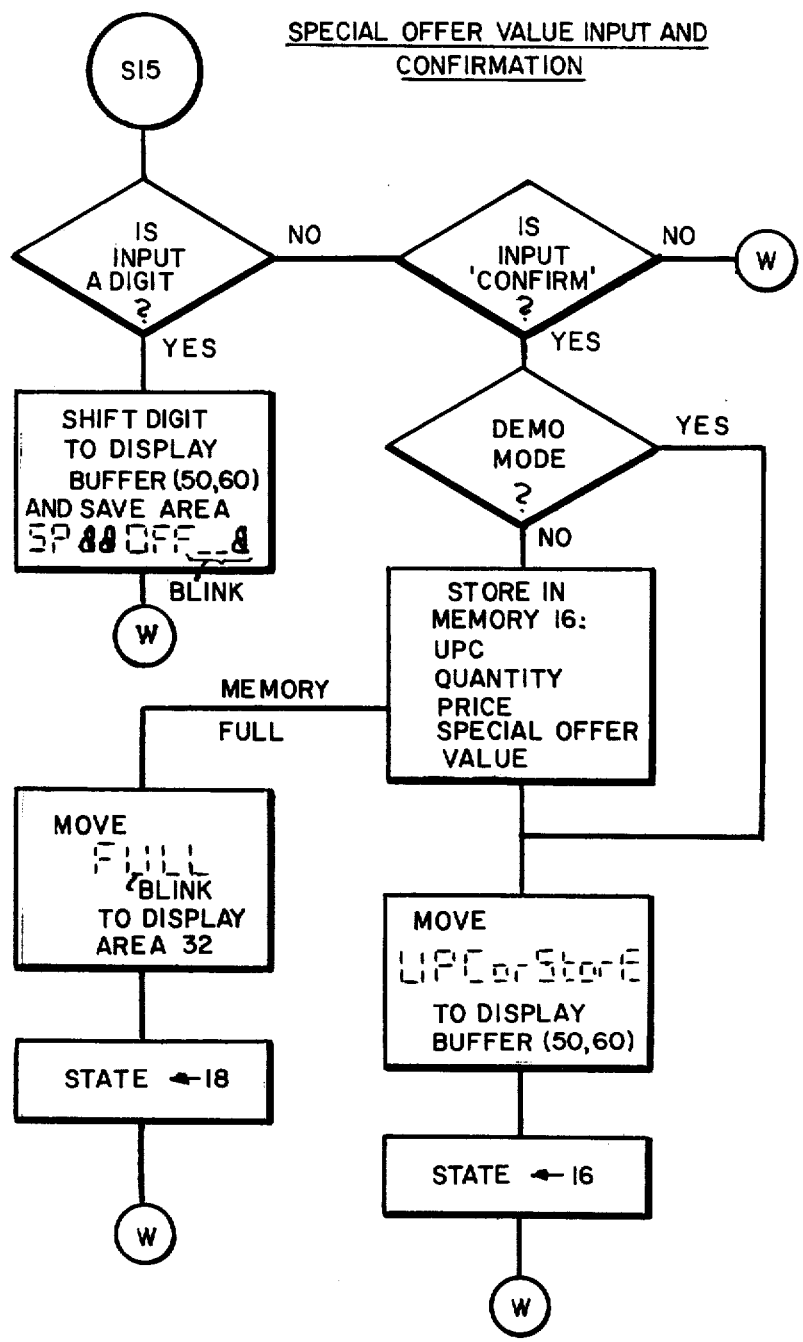
Figure 36:
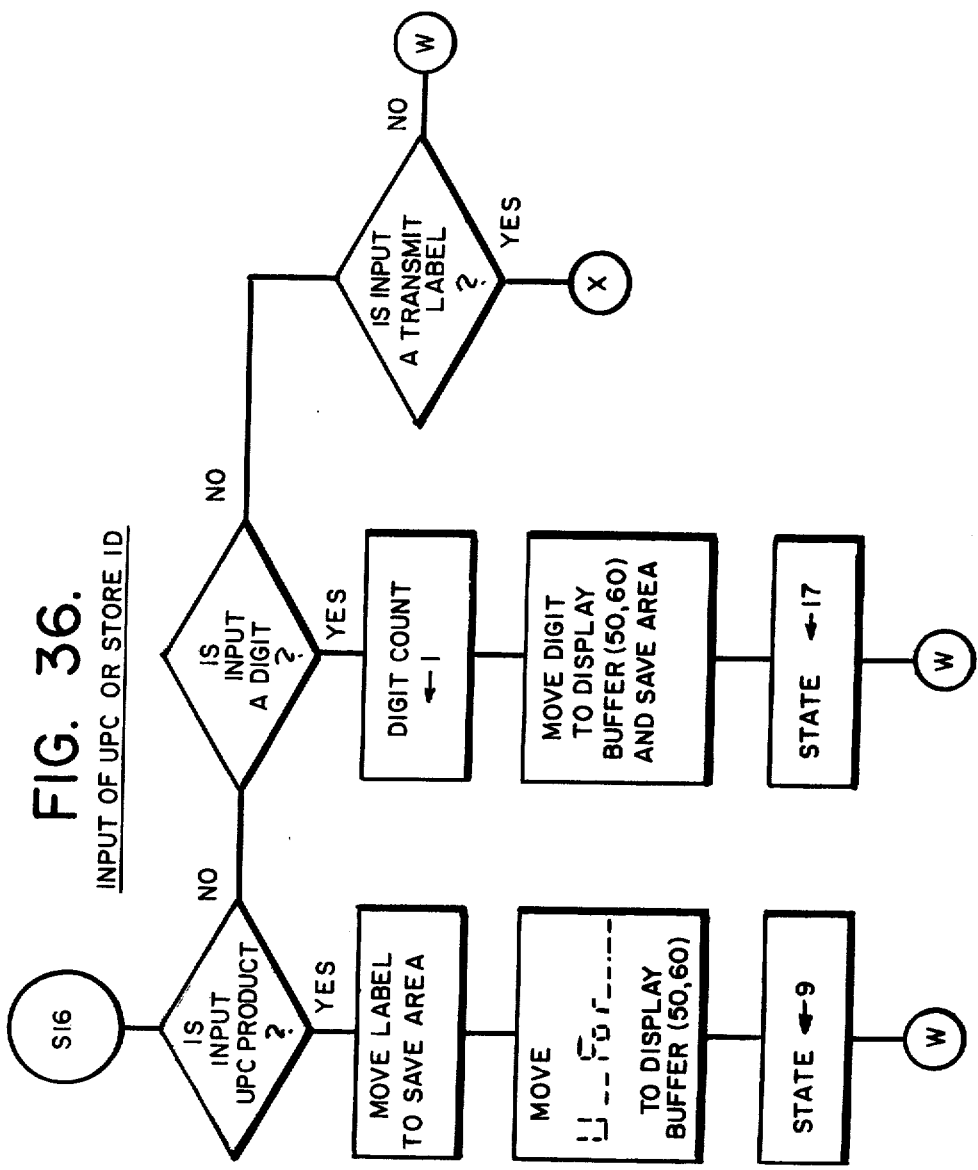
Figure 37:
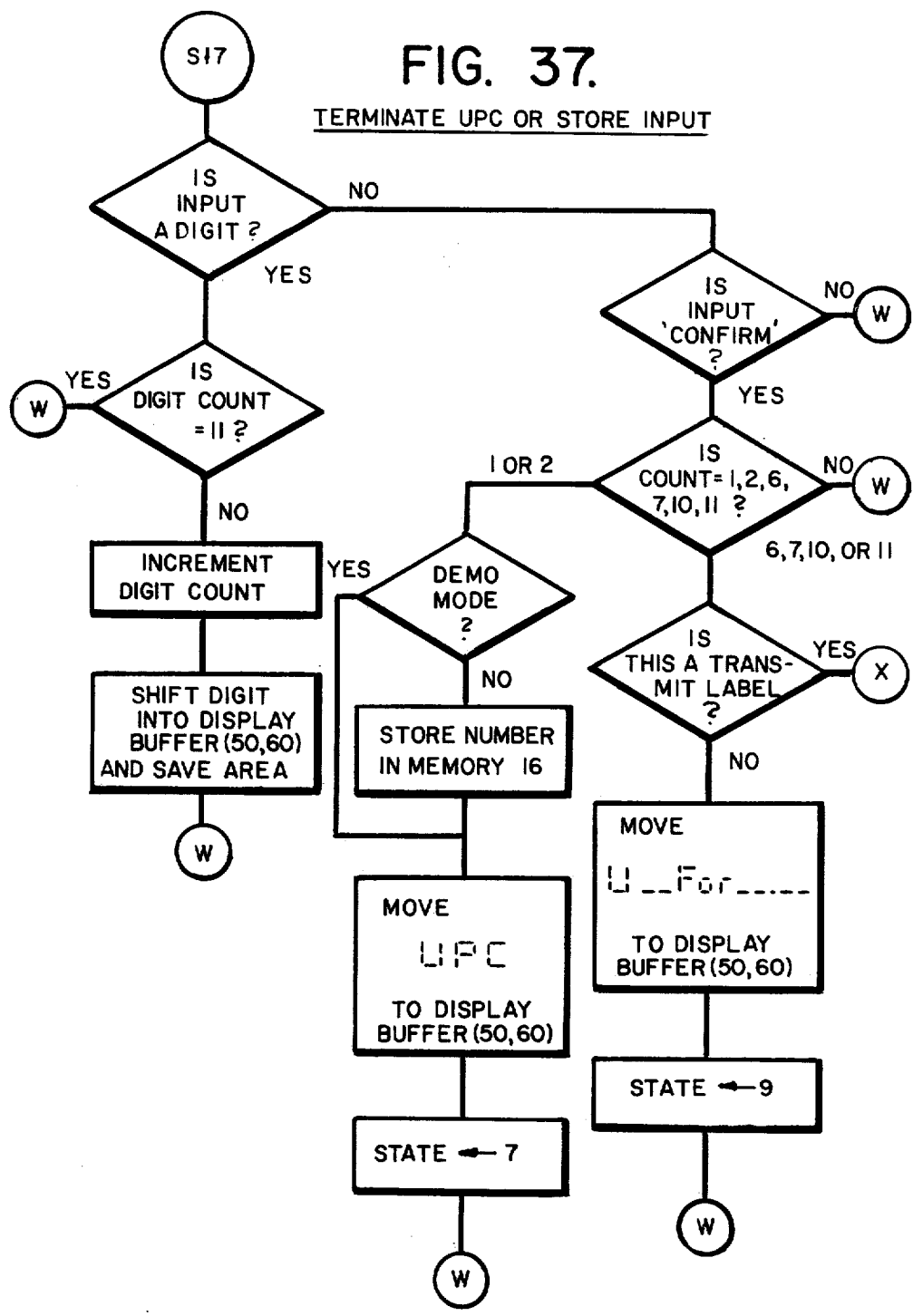

Assuming there is a special offer on the product being surveyed, the special offer code is entered in state S13 from the barboard 29 or keyboard 69 as shown in FIGS. 33 and 34. The specials field (3 digits) preferably displays blinking underscores on display 32 to prompt the panelist that this field is to be filled first. If there is no special offer on the product, a CONFIRM (*) command (state S13) entered by the panelist will return the terminal 8 to the UPC or STORE mode for entry of data on a different product. Alternatively, if a special offer entry has been made, a CONFIRM (*) command (state S14) causes the cents off (3 digits) display underscores to blink to prompt the panelist as to the next field to be filled.

The cents off mode (state S15 in FIG. 35) allows data entry of the dollar value of the special offer. Preferably the underscores and digits in the display 32 will blink until a CONFIRM (*) command (state S15, FIG. 35) is entered resulting in a tone from buzzer 34 and display of the UPC or STORE prompt message for entry of data on a different product. If there is no price value for the special offer a CONFIRM (*) command will cause the display 32 to skip to the UPC or STORE prompt message display. This returns the terminal 8 to readiness for entering the next UPC label or STORE ID in state S16, FIG. 36. At this point, entry of a valid UPC label returns the terminal 8 to the UPC label data entry and display (state S9 in FIG. 28). Entering a digit from the keyboard 69 or barboard 29 results in a display of the digit in the right-most position (state S17 in FIG. 36). Entering a CONFIRM (*) command after entry of one or two digits (FIG. 37) will return the system 6 to the state S7 with display of the prompt message UPC. Entering a CONFIRM (*) command after entry of 6, 7, 10 or 11 digits will return the system 6 to state S9 in which a display of the prompt message "U__For__·__" (FIG. 37) is provided and the sequence previously described with reference to FIGS. 28 and 29 may be commenced.

Figure 38:
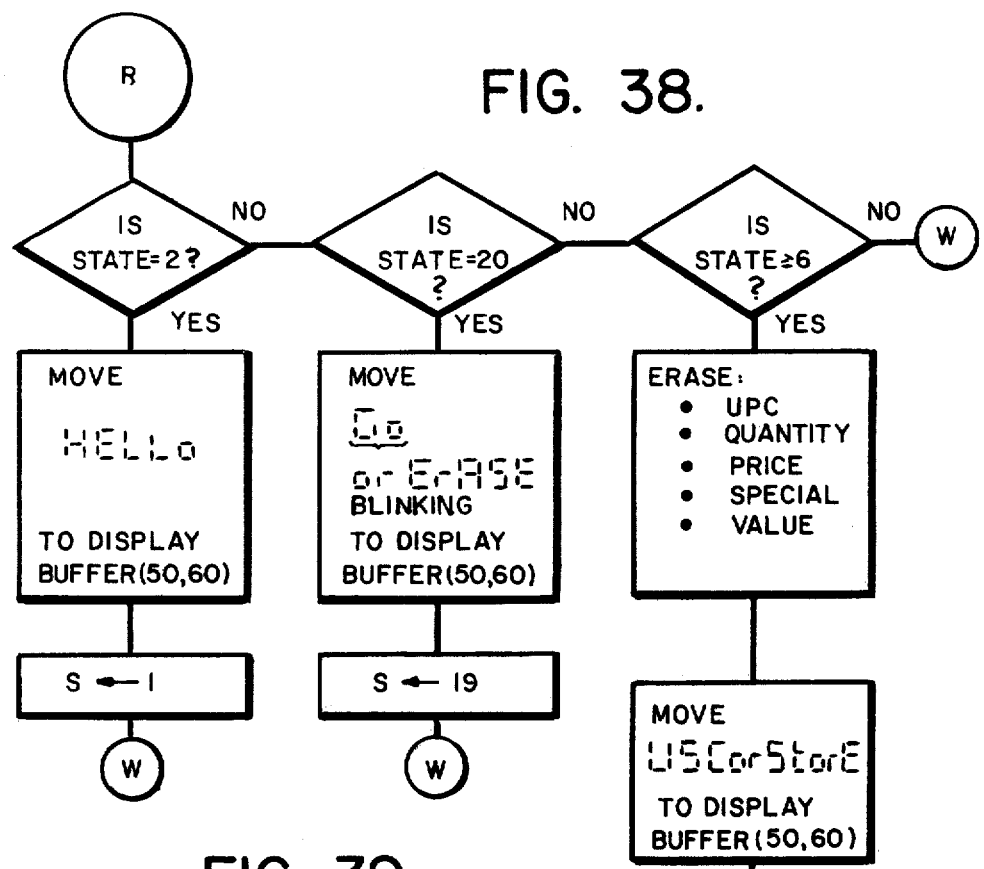

It should be noted that, preferably, at any point during product data entry a RESET (#) command may be entered in which instance the sequence illustrated in FIG. 38 will preferably be followed. As shown and preferred in FIG. 38, in response to this RESET (#) command the data for this product (i.e., everything since and including the last product label) will be erased. The display 32 will then read UPC or STORE and entry of a new store code or product label in the manner previously described may then occur. However, if the RESET (#) command is entered immediately following confirmation of the store code, the system 6 will then allow re-entry of the store code.

Preferably, the operation of the system 6 as described above is dependent on a series of defined preferred conditions. Thus, keyboard 69 or barboard 29 entries are preferably not accepted by the system 6 until a CONFIRM (*) command is entered, thereby minimizing the potential for erroneous data entry. Such a CONFIRM (*) command preferably is acknowledged by production of a tone from buzzer 34 and a change in the display 32. Prior to entry of the CONFIRM (*) command, keyboard 69 or barboard 29 data entries may be overwritten (with the exception of manual entry of product or command labels). As stated above, entry of a RESET (#) command during product data entry will erase all data for this product. In addition, erroneous data entry is also minimized by preferably displaying all data entered by the keyboard 69 or barboard 29 on display 32 so that the user or panelist may verify the data prior to entry of a CONFIRM (*) command. However, preferably entry of user identification codes or UPC labels by wand 28 do not result in a display of the entry on display 32, nor is a CONFIRM (*) command required. Rather, the terminal 8 preferably sounds a tone via buzzer 34 and displays the next prompt message on display 32. All other entries, as stated above, require a CONFIRM (*) command to be entered. Another area for potential erroneous data entry could occur if the user attempted to enter data when the memory 16 was full, thus resulting in overwritten or lost data. In order to avoid this problem, if the memory 16 is full at any time during product entry; that is the memory 16 cannot store another complete market survey trans-action, then the terminal 8 will automatically display a prompt message FULL on display 32, which prompt message will preferably blink to insure the user is alerted (see FIGS. 19, 33, 38). If this occurs, the terminal 8 or system 6 is then in state S18 (FIG. 39) in which the terminal 8 is ready to transmit the stored market survey data to the remote computer via telephone lines through a telephone handset and the acoustic coupler 30. At this point, entry of a CONFIRM (*) command, after the terminal 8 is properly coupled to the telephone line, will begin transmission.

Figure 39:
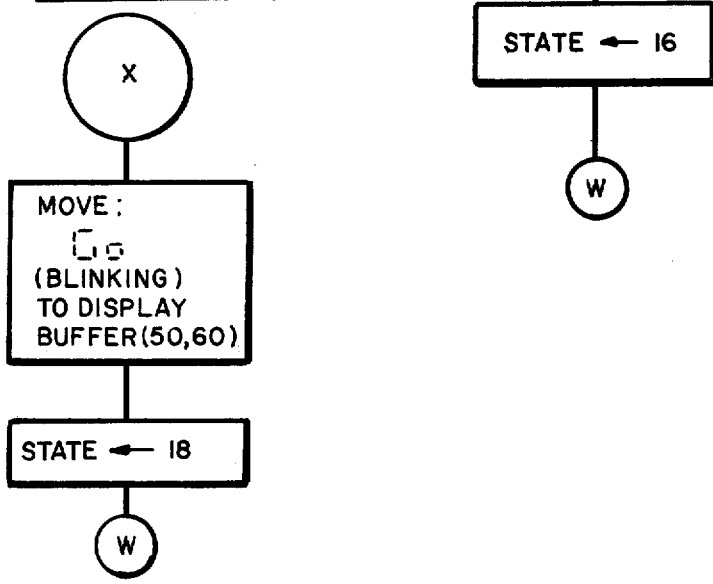

In this transmission mode, once connection is made to the remote computer via the telephone link, the panelist preferably wands the TRANSMIT ENABLE code on the panelist ID card with the wand 28 (state S18, FIG. 39). The terminal 8 then displays a blinking prompt message GO on display 32. If the panelist then enters the CONFIRM (*) command, the system 6 then sends all stored data to the remote computer over the telephone link. The format of this transmission is preferably as follows:

| ID | 1XXXXXXX[CR][LF] | where: [CR] = carriage return, |
|---|---|---|
| DAY | 2X[CR][LF] | [LF] = line feed |
| STORE | 3XX [CR][LF] | and X,Q,P,S & V are typical data characters |
| UPC | 4XXXXXXXXXXXXQQPPPPSSVVV[CR][LF] | |

Figure 40:
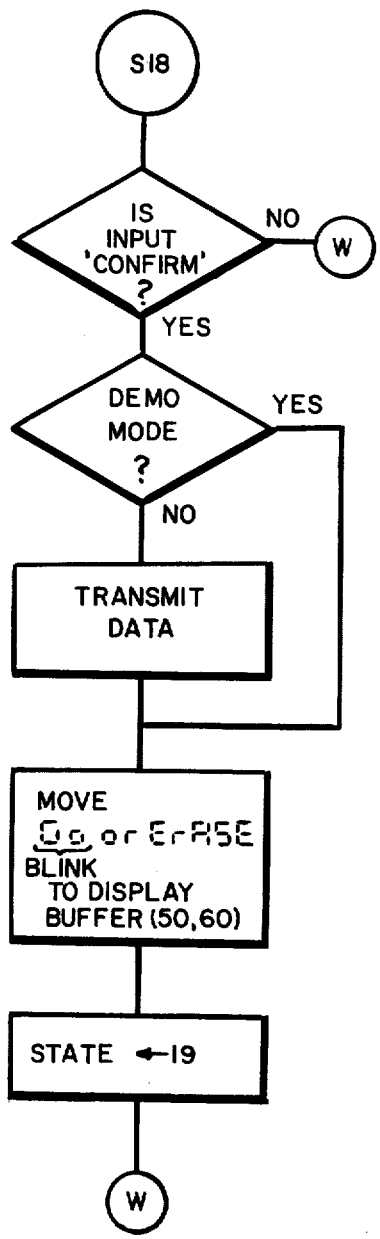
Figure 43:
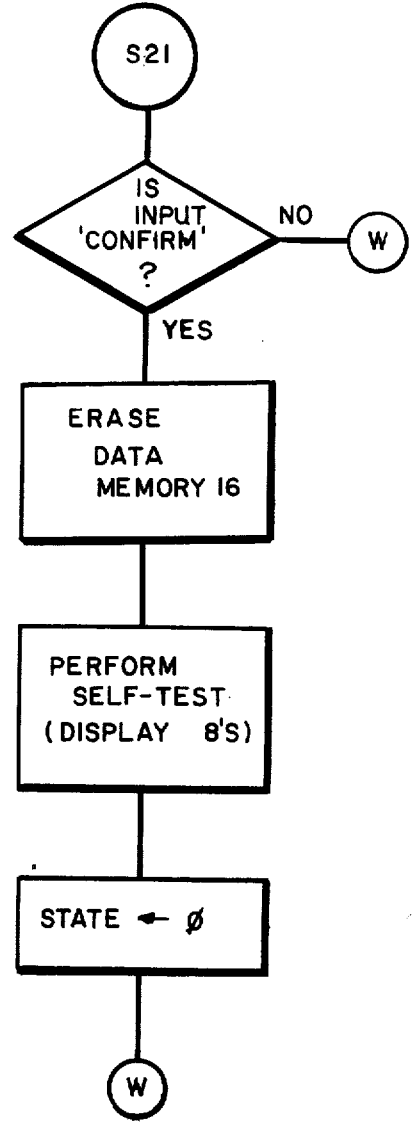
Figure 41:
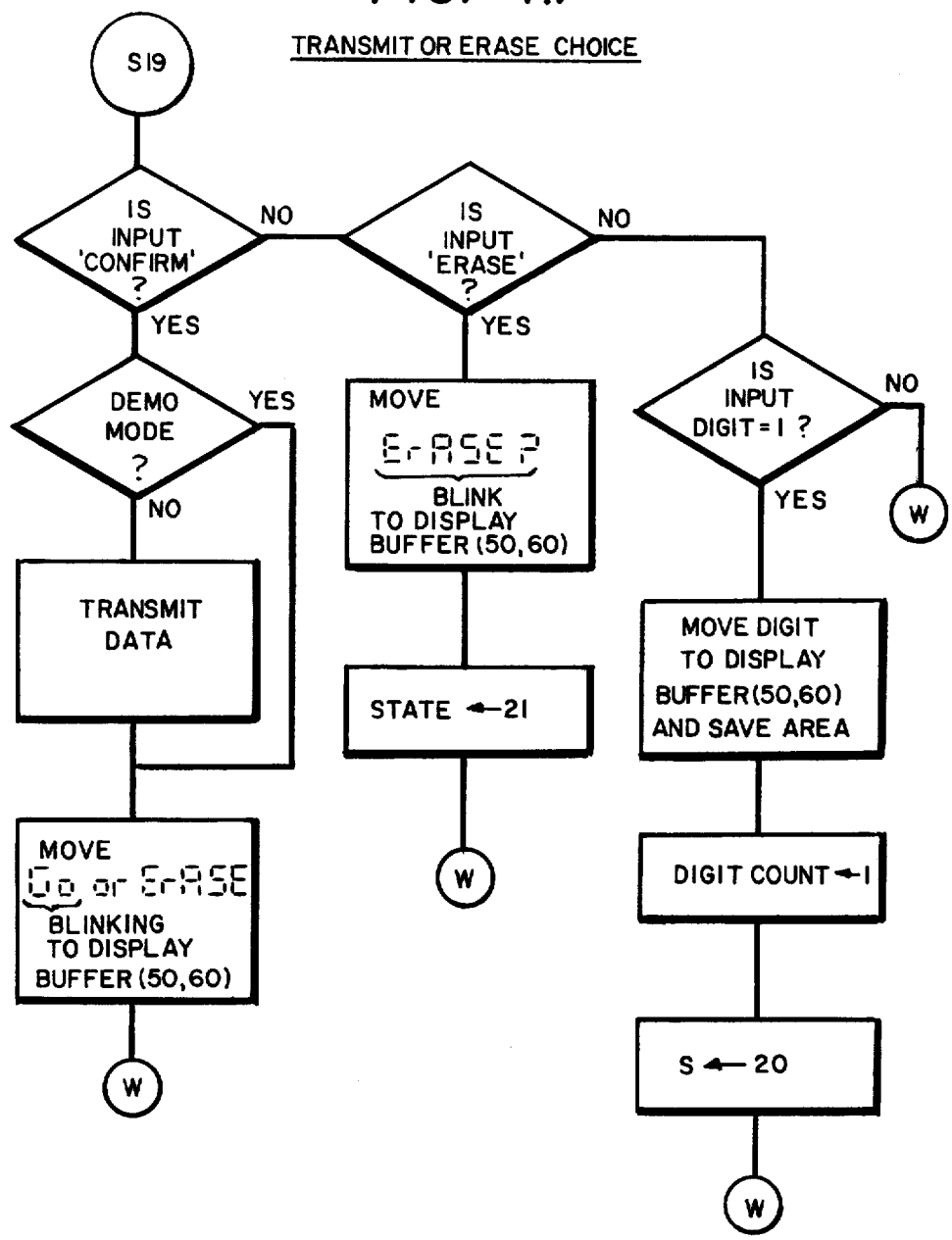

At the completion of this data transmission the display 32 preferably displays the prompt message GO or ERASE with the message GO preferably blinking (state S19, FIGS. 40, 41). Preferably, the display 32 is off during the above transmission. After the prompt message GO or ERASE is displayed, the panelist can either retransmit by reentering the CONFIRM (*) command or can erase memory 16 in preparation for a new data collection sequence. If the panelist desires to now erase memory 16, this may preferably be accomplished by wanding the ERASE MEMORY ENABLE code on the panelist ID card with wand 28. The display 32 will then preferably blink the prompt message ERASE? (state S21, FIG. 42). If the panelist then enters the CONFIRM (*) command, the terminal 8 will then preferably erase memory 16 and automatically perform the self-test illustrated in FIG. 19, ending in an all 8's display Sϕ (FIG. 43) on display 32. At this point, the terminal 8can preferably be switched to STANDBY or immediately used in another market survey data collection sequence with entry of a CONFIRM (*) command. It should be noted that, preferably, the ERASE MEMORY ENABLE command will be ignored by the system 6 until there has been at least one data transmission from the terminal 8.

If desired, the system 6 may be employed in a DEMONSTRATION mode in which case no data is stored or altered in the memory 16 during the DEMONSTRATION sequence. To enter this mode, the panelist preferably scans a DEMO code instead of a PANELIST IDENTIFICATION code and the above described sequence commences as referred to in FIG. 22 with the exception that no data is stored or altered in memory 16.

Summarizing the presently preferred market survey data collection method of the present invention using the system 6 of the present invention, various commands and market survey data are entered into the system 6 using the wand 28 and either the barboard 29 or keyboard 69 depending whether the embodiment of FIG. 13 or FIG. 14 is employed, with both the entry and transmission of this data preferably following a predefined sequence prompted by automatically displayed prompt messages. In following the presently preferred market survey data collection sequence, assuming the terminal 8 has been initialized, the panelist enters his or her identification code via the wand 28 and/or barboard 29 and/or keyboard 69 so that the source of the data can be identified including associated demographic information if desired. The next prompt message displayed is DAY in response to which the panelist enters the numeric equivalent 1 through 7 corresponding to the day of the week via the wand 28 and/or barboard 29 and/or keyboard 69.This number appears in the display, is verified by the panelist who then enters a CONFIRM (*) command which causes storage of this information and display of the next prompt message STORE. In response to display of the STORE prompt message, the panelist, using the wand 28 and barboard 29 and/or keyboard 69, then enters the number corresponding to the store at which the product was purchased, verifies this information in the display, and then enters a CONFIRM (*) command which causes storage of the information and display of the next prompt message UPC. This completes the product demographics phase of the market survey data collection sequence for each of the products purchased at that store. The terminal 8 is now ready to begin the product data collection phase which includes identification of each of the products by universal product code or UPC and provision of supplementary market survey data about each product, namely quantities, prices, and special offers, if any.

The following sequence of steps is preferably performed for each product purchased at the store identified in response to the STORE prompt message. In response to the UPC prompt message display, the panelist scans the UPC product label to enter and store the UPC code, unless the code is unscannable and must be entered via the barboard 29 or keyboard 69. Entry of the UPC code causes display of the next prompt message "U__For__._" in which "U" relates to the price of each product. The two underscores after "U" in the display blink to prompt the panelist to enter this information first, the panelist then enters this information via the barboard 29 or keyboard 69, verifies the quantity information entered in the display and enters a CONFIRM (*) command which causes storage of this information and causes the underscores after "For" in the display to blink, prompting the panelist to now enter the price information. The panelist then enters the price information via the barboard 29 or keyboard 69, verifies the price information entered in the display and enters a CONFIRM (*) command which causes storage of this information and causes a display of the next prompt message SP__OFF_.__, in which "SP" represents one of a predetermined quantity of available special offers, such as 16, and "OFF" represents the price or value of the special offer. As was previously mentioned, at any time prior to entry of the associated CONFIRM (*) command, if the data input being verified in the display is incorrect, it may be corrected merely by "overwriting" the data without the need to enter a RESET (#) command. If there is a special offer for the product the panelist first enters the code corresponding to the special offer in response to the underscores after the "SP" blinking in the display. The panelist verifies this data and enters a CONFIRM (*) command which causes storage of this information and causes the underscores after "OFF" to blink. If in response to this, the panelist enters the value of the special offer, verifies this data in the display and enters a CONFIRM (*) command, this causes storage of this information and causes display of the next prompt message UPC or STORE signaling initiation of a new transaction for a new product. If there is no special offer associated with that product, the panelist next enters a CONFIRM (*) command which causes the terminal 8 to recycle to accept market survey data pertaining to the new product and causes the prompt message UPC or STORE to be displayed. In either event, if the new product was purchased at the same store as the previously entered product, the panelist scans the UPC product label on the new product and repeats the above cycle. If, however, the new product was purchased at a different store from the previous product, the panelist then enters the new store number and continues as above. It should be noted that if the memory is full at the completion of a transaction for a product, that is, that the memory 16 cannot store another complete transaction, the display 32 will display the prompt message FULL at the completion of the last acceptable transaction. At such a point, or when requested, the panelist may then transmit the stored market survey data to the remote computer via the telephone link as previously described.

Thus, as can be seen from the foregoing, by utilizing the market survey data collection method and system of the present invention, market survey data may be rapidly collected and transmitted for anlaysis over a widespread geographic area with a minimum of time and potential error.

What is claimed is:

1. A method for independently electronically collecting related market survey data from a plurality of diverse locations for temporary storage at each of said independent diverse locations where said data is independently collected for subsequent transmission thereof from said independent diverse locations over a telephone type link for accumulative processing thereof at a remote central electronic data processor, said method at said independent data collection diverse locations comprising the steps of electronically independently displaying an interactive changeable prompt message display on a visual display device at said independent diverse location indicating a particular one of a plurality of market survey information categories in a predefined sequence of said categories, said categories comprising at least product identification data, pricing data and purchase demographic data; providing a market survey data input signal to a buffer storage means in response to said interactive prompt message display, said provided market survey data input signal comprising an actual data input corresponding to said particular category; selectively interactively processing said provided market survey data input signal at said diverse location in a microcomputer means in accordance with said predefined sequence; providing a verification signal corresponding to said actual data input in response to the input thereof at said independent diverse location for verifying entry of said actual data input; providing a confirmation command input signal to said microcomputer means in response to said verification signal; and independently temporarily storing said displayed particular category market survey data input signal content of said buffer storage means in a static memory means at said independent diverse location in response to said confirmation command input signal and changing said visual display at said diverse location for electronically displaying the next prompt message in said predefined sequence in response to said confirmation command input signal for providing a next temporarily storable corresponding market survey data input signal in response to said next prompt message, said sequence defining a market survey data transaction expository of each product, said interactive sequence recycling for each market transaction for enabling independent integral storage of each product transaction at said diverse location; whereby subsequently transmitted market survey data may be rapidly independently collected at a central location from a plurality of independent diverse locations for said accumulative processing thereof with minimal error potential.

2. An electronic market survey data collection method in accordance with claim 1 wherein said purchase demograhic data comprises store and day of purchase.

3. An electronic market survey data collection method in accordance with claim 1 wherein said market survey data input signal providing step comprises the step of optically scanning a product code on a product for providing said market survey data input signal corresponding to said product identification data.

4. An electronic market survey data collection method in accordance with claim 1 wherein said market survey data input signal providing step comprises the step of providing a keyboard data signal input from a keyboard array comprising a plurality of keys each corresponding to a unique keyboard symbol, said keyboard provided market survey data input signals corresponding to at least said pricing data and said purchase demographic data, and optically scanning a product code on a product for providing said market survey data input signal corresponding to said product identification data.

5. An electronic market survey data collection method in accordance with claim 1 wherein said interactive prompt message sequence comprises numeric product code identification, product quantity identification and product price identification.

6. An electronic market survey data collection method in accordance with claim 5 further comprising the step of directly advancing through said sequence to provide a prompt message display corresponding to the next category in said market survey transaction in response to provision of said confirmation command input signal during a prompt message display, whereby input of data relating to categories in said transaction which are inapplicable to the product defined in said transaction may be omitted.

7. An electronic market survey data collection method in accordance with claim 1 wherein said verification signal providing step comprises the step of electronically displaying said corresponding actual data input from said buffer storage on said visual display device in a verification display in response to the input thereof at said independent diverse location for verifying the correct entry of said actual data input.

8. An electronic market survey data collection method in accordance with claim 7 wherein said product identification data comprises a UPC type product code.

9. An electronic market survey data collection method in accordance with claim 8 wherein said market survey data input signal providing step comprises the steps of optically scanning a UPC product code on a product for providing said market survey data input signal corresponding to said identification data and selectively optically scanning a barboard array of UPC product type codes each corresponding to a unique keyboard symbol for providing said market survey data input signals corresponding to at least said picing data and said purchase demographic data.

* * * * *